(12) United States Patent
Muratani et al.

(10) Patent No.: US 8,411,369 B2
(45) Date of Patent: Apr. 2, 2013

(54) IMAGING LENS, OPTICAL APPARATUS INCLUDING IMAGING LENS AND METHOD FOR MANUFACTURING IMAGING LENS

(75) Inventors: Mami Muratani, Tokyo (JP); Issei Tanaka, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/253,493

(22) Filed: Oct. 5, 2011

(65) Prior Publication Data

US 2012/0026590 A1 Feb. 2, 2012

(30) Foreign Application Priority Data

Jan. 14, 2010 (JP) ................... 2010-005516
Oct. 21, 2010 (JP) ................... 2010-236640

(51) Int. Cl.
*G02B 15/14* (2006.01)
(52) U.S. Cl. ........................................ 359/686
(58) Field of Classification Search .................. 359/705, 359/686, 689
See application file for complete search history.

(56) References Cited

U.S. PATENT DOCUMENTS

| 6,028,716 | A | 2/2000 | Kato et al. |
| 7,009,779 | B2 | 3/2006 | Arakawa |
| 7,777,974 | B2 | 8/2010 | Yamamoto |
| 7,795,574 | B2 | 9/2010 | Kennedy et al. |
| 2002/0135831 | A1 | 9/2002 | Park |
| 2005/0254139 | A1 | 11/2005 | Takahashi et al. |
| 2009/0153980 | A1 | 6/2009 | Yamamoto |

FOREIGN PATENT DOCUMENTS

| JP | 09-090217 | 4/1997 |
| JP | 2000-284171 A | 10/2000 |
| JP | 2000-356704 A | 12/2000 |
| JP | 2004-212692 A | 7/2004 |
| JP | 2005-189727 A | 7/2005 |
| JP | 2008-298840 A | 12/2008 |
| JP | 2009-069414 | 4/2009 |
| JP | 2009-145587 | 7/2009 |
| JP | 2010-102056 | 5/2010 |

*Primary Examiner* — Scott J Sugarman
(74) *Attorney, Agent, or Firm* — Miles & Stockbridge P.C.

(57) ABSTRACT

An optical system includes, in order from an object side: a first lens group G1 having negative refractive power; and a second lens group G2 having positive refractive power; upon zooming from a wide-angle end state W to a telephoto end state T, a distance between the first lens group G1 and the second lens group G2 varying, and the second lens group G2 moving, and the second lens group G2 including a focusing lens group Gf that carries out focusing from an infinity object to a close object, and a decentering lens group Gs that is movable in a direction having a component perpendicular to an optical axis, thereby providing an optical system capable of establishing both of internal focusing and a decentering lens group with obtaining compactness and excellent optical performance, an optical apparatus equipped with the optical system, and a method for manufacturing the optical system.

27 Claims, 17 Drawing Sheets

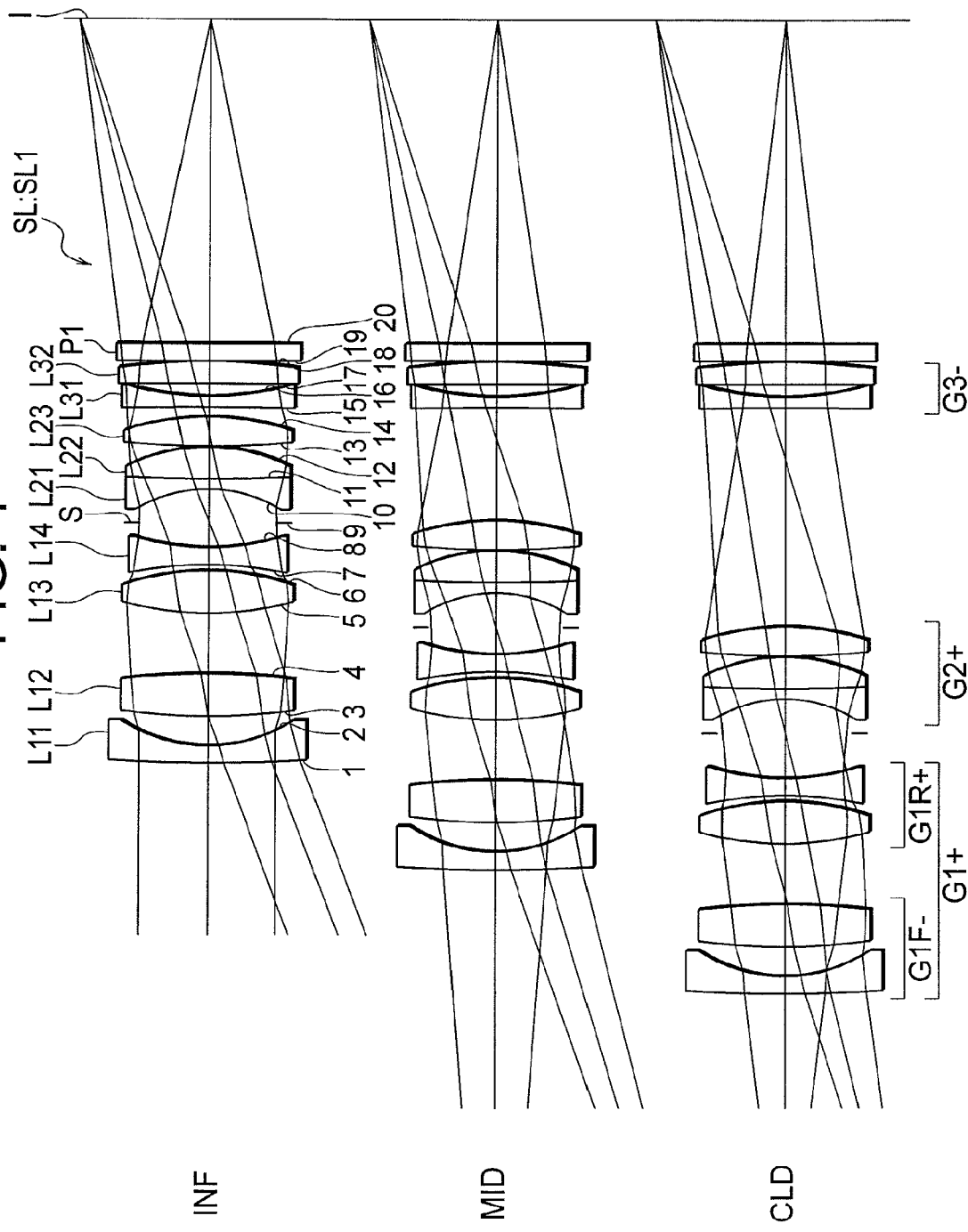

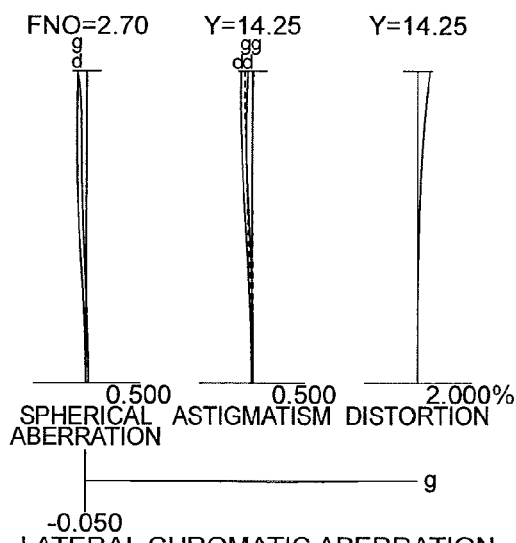
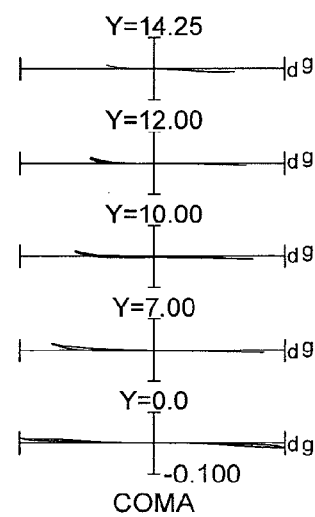
FIG. 2A
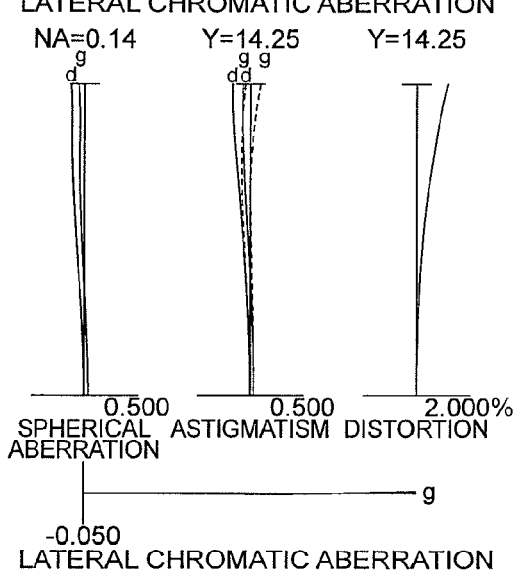
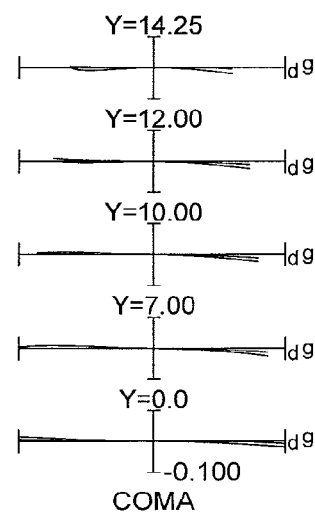
FIG. 2B
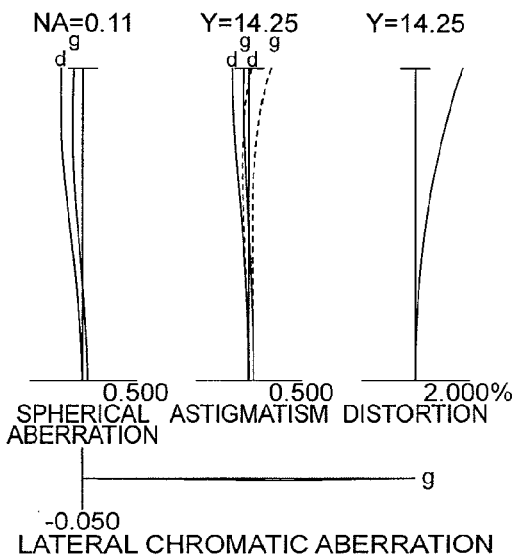
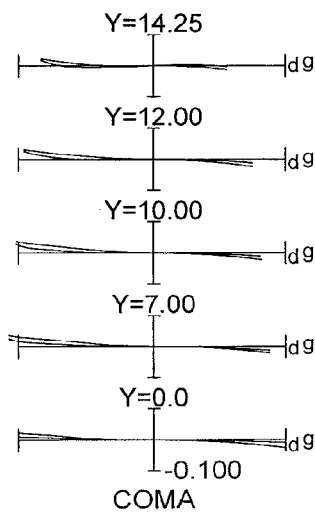
FIG. 2C

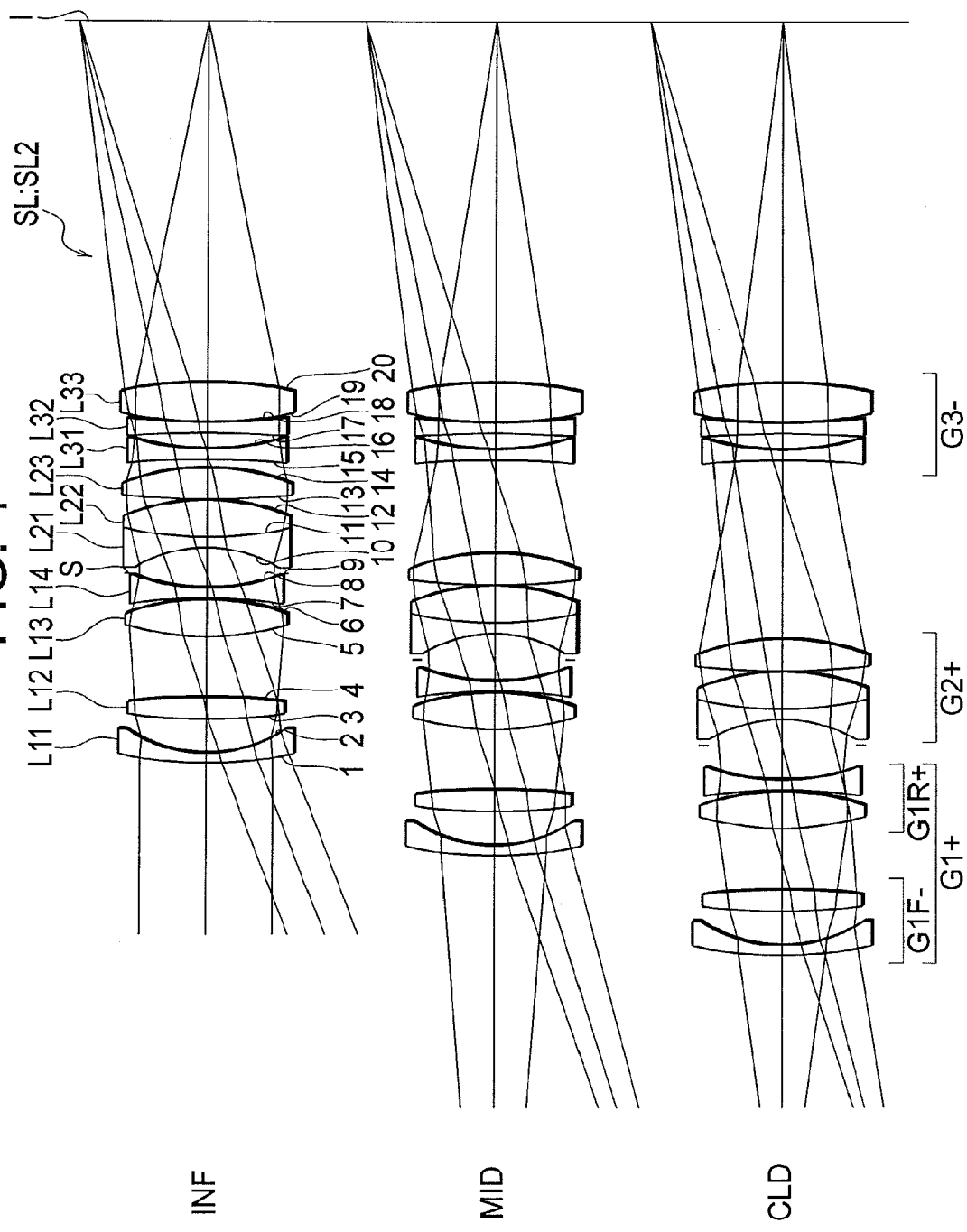

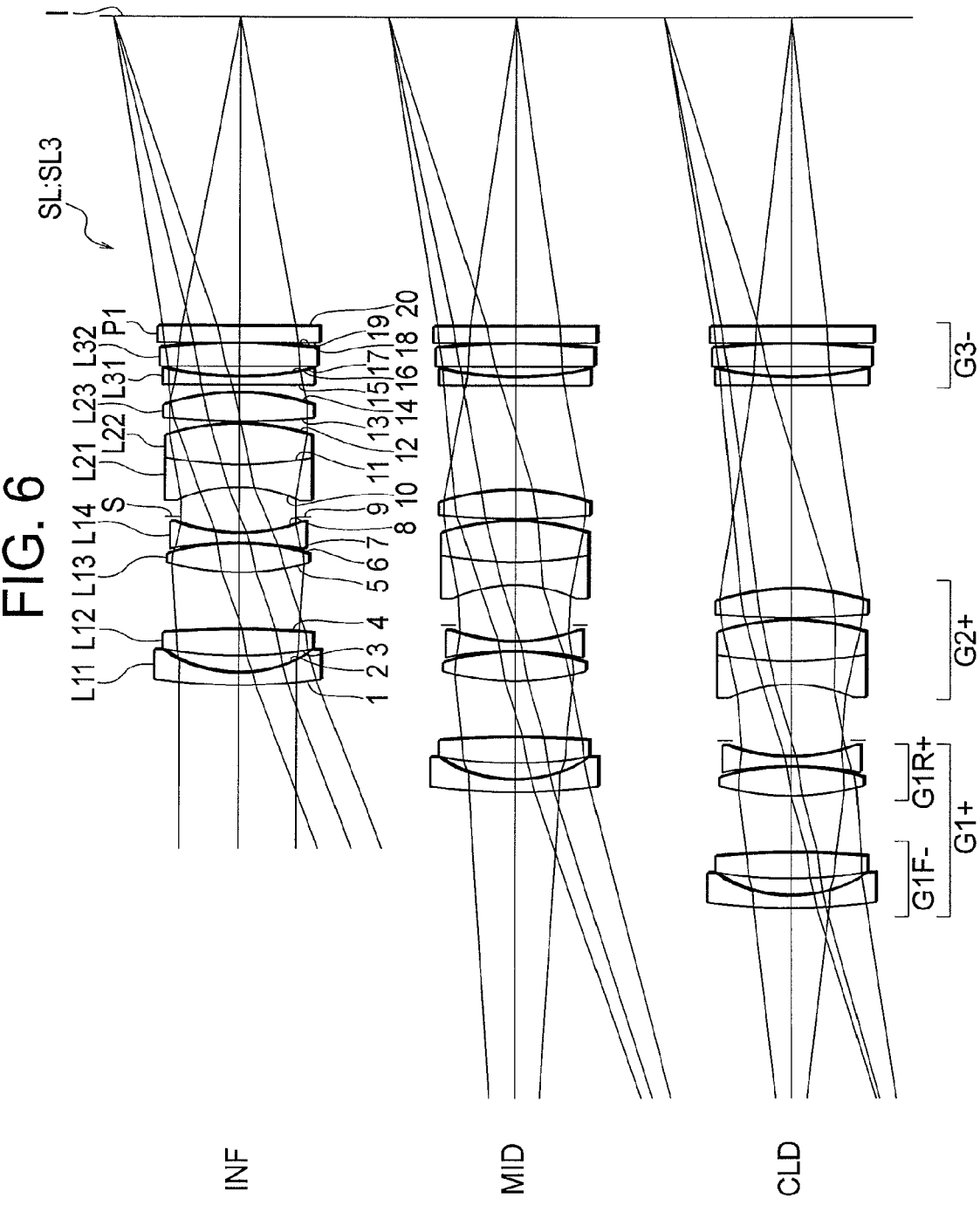

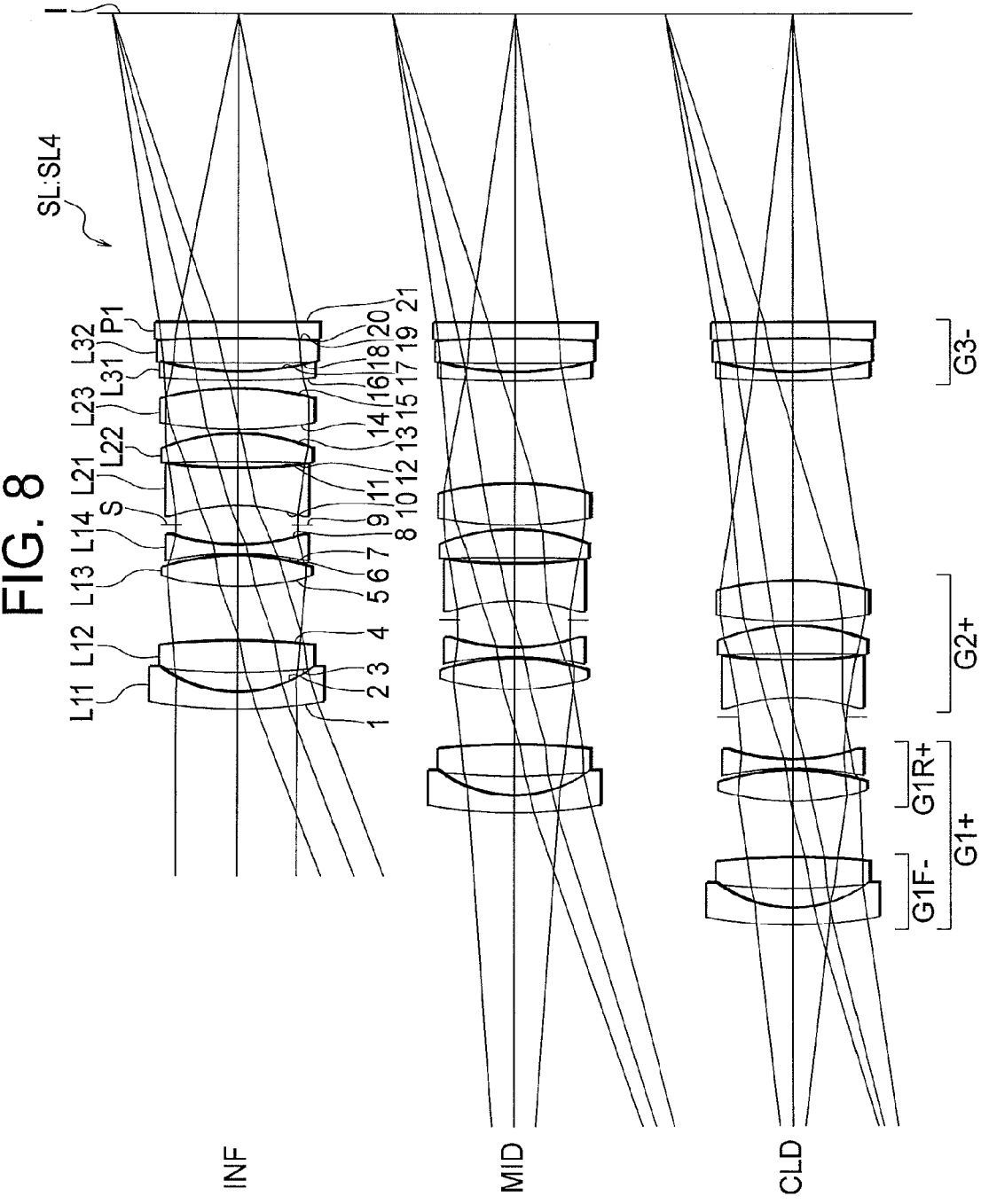

IMAGING LENS, OPTICAL APPARATUS INCLUDING IMAGING LENS AND METHOD FOR MANUFACTURING IMAGING LENS

CROSS-REFERENCE TO RELATED APPLICATIONS

This application is a continuation of application Ser. No. 13/006,210 filed Jan. 13, 2011.

The disclosure of the following priority applications are herein incorporated by reference:

Japanese Patent Application Laid-Open No. 2010-005516 filed on Jan. 14, 2010, and Japanese Patent Application Laid-Open No. 2010-236640 filed on Oct. 21, 2010.

BACKGROUND OF THE INVENTION

1. Field of the Invention

The present invention relates to an imaging lens, an optical apparatus including the imaging lens and a method for manufacturing the imaging lens.

2. Related Background Art

A macro lens capable of photographing a near-distance object point up to shooting magnification of −1.0 from an infinite-distance object point has hitherto been proposed (refer to, e.g., Japanese Patent Application Laid-Open No. 2000-284171). Further, a general type of macro lens based on a 3-group configuration is a macro lens in which a first lens group and a second lens group configure a double Gaussian type, and a third lens group serving as a rear converter is added just posterior thereto. Particularly, the third lens group is formed as a negative lens group for downsizing in overall length in many cases. Further, over the recent years, increased strictness about ghost images and flare defined as one of factors, which affect not only aberration correction performance but also optical performance, has been requested of the 3-group configuration macro lens capable of photographing the near-distance object point. Therefore, a request for the higher performance is given also to an antireflection coating formed on a lens surface, and a multi-layered film design technique and a multi-layered film growth technique continue their developments (refer to, e.g., Japanese Patent Application Laid-Open No. 2000-356704).

If the third lens group has negative refractive power, however, such a problem arises that an image plane deviates in an object-sided direction due to a strong diverging component on the rear side with the result that a sufficient back focus cannot be ensured. Moreover, focusing is conducted in a way that shifts each lens group toward the object side in many cases, however, it is preferable that the third lens group is formed as a fixed lens group in order to simplify a lens barrel mechanism and increase a degree of freedom.

SUMMARY OF THE INVENTION

It is an object of the present invention, which was devised in view of the problems described above, to provide an imaging lens capable of reducing a total lens length and a moving amount for simplifying a configuration of a lens barrel in a way that maintains a sufficient back focus while keeping an ample angle of view.

It is another object of the present invention to provide an imaging lens capable of further decreasing ghost images and flare and reducing the total lens length and the moving amount of each lens group with the simplified configuration of the lens barrel in a way that maintains the sufficient back focus while keeping the ample angle of view, an optical apparatus including this imaging lens and an imaging lens manufacturing method.

To accomplish the above objects, according to a first aspect of the present invention, there is provided an imaging lens comprising, in order from an object side: a first lens group having positive refractive power; a second lens group having positive refractive power; and a third lens group having negative refractive power, said first lens group including a negative meniscus lens with a concave surface directed to an image side disposed closest to the object, an aperture stop being disposed between said first lens group and said second lens group, and said first lens group and said second lens group moving to the object side with changing a distance between said first lens group and said second lens group upon focusing on a near-distance object point from an infinite-distance object point.

In the first aspect of the present invention, it is preferable that at least one optical surfaces of said first lens group is provided with an antireflection coating, and said antireflection coating includes at least, one layer formed by use of a wet process.

According to a second aspect of the present invention, there is provided an optical apparatus including the first aspect.

According to a third aspect of the present invention, there is provided a method for manufacturing an imaging lens comprising, in order from an object side: a first lens group having positive refractive power; a second lens group having positive refractive power; and a third lens group having negative refractive power, the method comprising steps of: disposing a negative meniscus lens with a concave surface directed to an image side on the side closest to the object of said first lens group; disposing an aperture stop between said first lens group and said second lens group; and disposing said first lens group and said second lens group with moving to the object side in such a manner that upon focusing on a near-distance object point from an infinite-distance object point a distance between said first lens group and said second lens group varies.

In the third aspect of the present invention, it is preferable that the method further comprising a step of: applying an antireflection coating to at least one optical surface among the first lens group through the third lens group such that the antireflection coating includes at least one layer formed by a wet process.

The configurations of the imaging lens, the optical apparatus including the imaging lens and the imaging lens manufacturing method according to the present invention, enable the total lens length and the moving amount to be reduced and enable ghost images and flare to be further decreases so as to simplify the configuration of the lens barrel in a way that maintains the sufficient back focus while keeping the ample angle of view.

BRIEF DESCRIPTION OF THE DRAWINGS

FIG. 1 is a sectional view showing a configuration of an imaging lens according to Example 1, in which (INF) represents an infinite-distance in-focus state, (MID) indicates shooting magnification of −0.5 state, and (CLD) represents shooting magnification of −1.0 state.

FIGS. 2A, 2B, 2C are diagrams of various aberrations of the imaging lens according to Example 1; FIG. 2A is the diagram of the various aberrations in the infinite-distance in-focus state; FIG. 2B is the diagram of various aberrations in shooting magnification of −0.5 state; and FIG. 2C is the diagram of the various aberrations in shooting magnification of −1.0 state.

FIG. 4 is a sectional view showing a configuration of an imaging lens according to Example 2, in which (INF) represents the infinite-distance in-focus state, (MID) indicates shooting magnification of −0.5 state, and (CLD) represents shooting magnification of −1.0 state.

FIG. 5A is the diagram of the various aberrations in the infinite-distance in-focus state; FIG. 5B is the diagram of various aberrations in shooting magnification of −0.5 state; and FIG. 5C is the diagram of the various aberrations in shooting magnification of −1.0 state.

FIG. 6 is a sectional view showing a configuration of the imaging lens according to Example 3, in which (INF) represents the infinite-distance in-focus state, (MID) indicates shooting magnification of −0.5 state, and (CLD) represents shooting magnification of −1.0 state.

FIG. 7A is the diagram of the various aberrations in the infinite-distance in-focus state; FIG. 7B is the diagram of various aberrations in shooting magnification of −0.5 state; and FIG. 7C is the diagram of the various aberrations in shooting magnification of −1.0 state.

FIG. 8 is a sectional view showing a configuration of the imaging lens according to Example 4, in which (INF) represents the infinite-distance in-focus state, (MID) indicates shooting magnification of −0.5 state, and (CLD) represents shooting magnification of −1.0 state.

FIG. 9A is the diagram of the various aberrations in the infinite-distance in-focus state; FIG. 9B is the diagram of various aberrations in shooting magnification of −0.5 state; and FIG. 9C is the diagram of the various aberrations in shooting magnification of −1.0 state.

DESCRIPTION OF THE MOST PREFERRED EMBODIMENT

Figure 3:
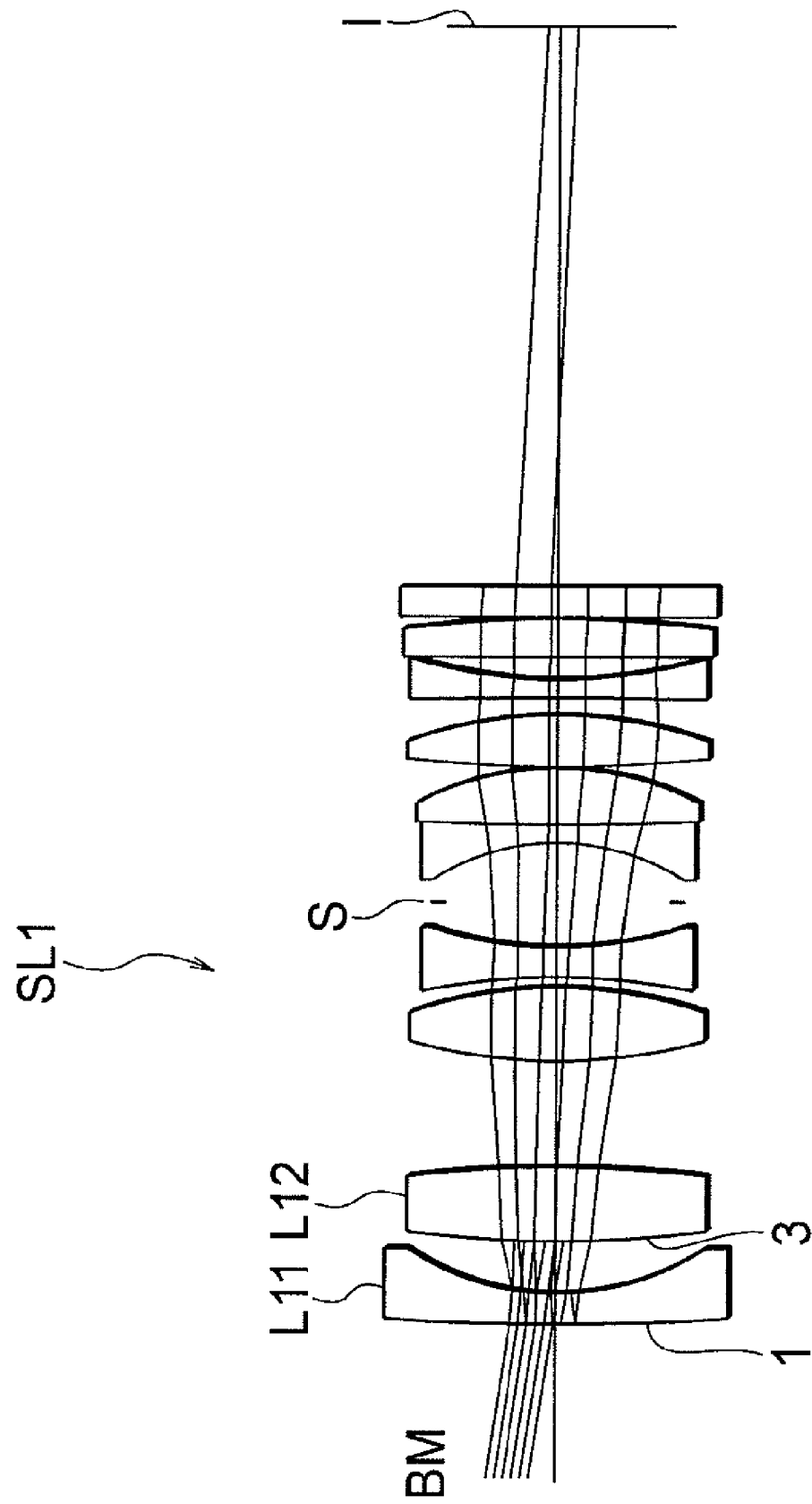
FIG. 3 is a sectional view showing the configuration of the imaging lens SL according to Example 1, illustrating one example of how incident light beams are reflected by a first ghost image occurrence surface and a second ghost image occurrence surface.

An exemplary embodiment of the present invention will hereinafter be described with reference to accompanying drawings. As shown in FIG. 1, an imaging lens SL is composed of, in order from an object side; a first lens group G1 having positive refractive power, a second lens group G2 having positive refractive power and a third lens group G3 having negative refractive power. Further, the first lens group G1 includes a negative meniscus lens L11 positioned closest to the object side with a concave surface directed to an image side, and an aperture stop S is disposed between the first lens group G1 and the second lens group G2. Moreover, the imaging lens SL according to the present embodiment, upon focusing on a near-distance object point from an infinite-distance object point, the first lens group G1 and the second lens group G2 move on the object side while changing a distance between the lens groups. The imaging lens SL according to the present embodiment thus simplifies a lens barrel mechanism by reducing a total lens length in such a way that the third lens group G3 having negative refractive power receives light beams converged by the lens groups having positive refractive power, which are based on the first lens group G1 and the second lens group G2.

Conditions for configuring this type of imaging lens SL will hereinafter be described. It is desirable that the imaging lens SL satisfies the following conditional expression (1):

$$0.5 \leq (-\beta) \quad (1)$$

where $\beta$ denotes a shooting magnification upon focusing on the nearest object point.

Conditional expression (1) is an expression which specifies the shooing magnification upon focusing on the nearest object point. When the value $(-\beta)$ falls below the lower limit of the conditional expression (1), an effect of the lens as a macro lens cannot be exhibited, which is an undesirable point. Further, it is preferable in order to ensure the effects of the present embodiment that the lower limit of the conditional expression (1) is set to 0.75. Moreover, it is preferable in order to further ensure the effects of the present embodiment that the lower limit of the conditional expression (1) is set to 1.00.

Further, it is desirable that the imaging lens SL according to the present embodiment satisfies the following conditional expression (2):

$$0.07 < f2/f1 < 0.35 \quad (2)$$

where f1 denotes a focal length of the first lens group G1, and f2 denotes a focal length of the second lens group G2.

Conditional expression (2) is an expression which specifies a ratio of the focal length of the first lens group G1 to the focal length of the second lens group G2. The present embodiment takes a configuration, in which the third lens group G3 having negative refractive power receives the light beams converged by the first lens group G1 and the second lens group G2 for reducing the total lens length, however, if a rear side has a strong divergent component, a sufficient back focus is not acquired. Such being the case, the conditional expression (2) is established to keep a balance so as to enable the back focal length and an angle of view to be ensured in a way that gives an effect of a retro focus to a modified Gaussian lens group composed of the first lens group G1 defined as the lens group having positive refractive power and the second lens group G2 defined as the lens group having positive refractive power.

When the value f2/f1 is equal to or exceeds the upper limit of the conditional expression (2), the second lens group G2 gets excessively close in distance to the third lens group G3 upon focusing on the infinite-distance object point, with the result that the second lens group G2 and the third lens group G3 interfere with each other. Further, power of the first lens group G1 is excessively intensified, resulting in difficulty of correcting spherical aberration and an image plane, which is an undesirable point. Further, it is preferable in order to ensure the effects of the present embodiment that the upper limit of the conditional expression (2) is set to 0.30. Moreover, it is preferable in order to further ensure the effects of the present embodiment that the upper limit of the conditional expression (2) is set to 0.25. When the value f2/f1 is equal to or falls blow the lower limit of the conditional expression (2), the focal length of the first lens group G1 is excessively elongate, with the result that a moving amount when in focus (in-focus moving amount) increases. Alternatively, the focal length of the second lens group G2 becomes excessively short, with the result that spherical aberration becomes too large, which is an undesirable point. Moreover, it is preferable in order to ensure the effects of the present embodiment that the lower limit of the conditional expression (2) is set to 0.09. Further, it is preferable in order to further ensure the effects of the present embodiment that the lower limit of the conditional expression (2) is set to 0.11.

Further, in the imaging lens SL according to the present embodiment, it is desirable that the first lens group G1 includes, in order from the object side, a negative lens (a negative meniscus lens L11 in FIG. 1) with a concave surface directed to the image side, a first positive lens (a double convex lens L12 in FIG. 1) and a second positive lens (a double convex lens L13 in FIG. 1). Then, the imaging lens SL according to the present embodiment, it is desirable, satisfies the following conditional expression (3):

$$0.10 < Da/Db < 2.00 \quad (3)$$

where Da denotes a distance along the optical axis between a surface closest to the image side of the negative lens L11 and a surface closest to the object side of the first positive lens L12, and Db denotes a distance along the optical axis between the surface closest to the image side of the first positive lens L12 and the surface closest to the object side of the second positive lens L13.

Conditional expression (3) is an expression which specifies a proper proportion with respect to a ratio of a distance between the negative lens L11 disposed closest to the object side within the first lens group G1 and the first positive lens L12 disposed closer to the image side thereof to a distance between the first positive lens L12 and the second positive lens L13 disposed closer to the image side thereof. The negative lens L11 disposed closest to the object side in the first lens group G1 is a negative meniscus lens of which the image-sided surface has a stronger curvature, and hence off-axis light beams emerging from the negative lens L11 get emerged at a larger angle of deviation with a larger distance from the optical axis. Therefore, it is required that an aberration generated by the negative power be canceled by the positive power of the positive lens disposed as closer as possible. Further, the sufficient distance from the first positive lens L12 to the second positive lens L13 is ensured, thereby enabling spherical aberration to be corrected straight.

When the value Da/Db is equal to or exceeds the upper limit of conditional expression (3), the first positive lens L12 and the second positive lens L13 become too close in their distance, with the result that an increased load is applied to the object-sided negative lens L11 and the first positive lens L12 which are to maintain the angle of view, and it is therefore difficult to correct various aberrations as well as spherical aberration, which is an undesirable point. Further, it is preferable in order to ensure the effects of the present embodiment that the upper limit of conditional expression (3) is set to 1.25. Moreover, it is preferable in order to further ensure the effects of the present embodiment that the upper limit of conditional expression (3) is set to 1.00.

On the other hand, when the value Da/Db is equal to or falls below the lower limit of conditional expression (3), the distance between the first positive lens L12 and the second positive lens L13 excessively expands, and hence it is unfeasible to take the balance from the infinite-distance object point to the near-distance object point, and especially lateral chromatic aberration becomes hard to be corrected, which is an undesirable point. Furthermore, it is preferable in order to ensure the effects of the present embodiment that the lower limit of conditional expression (3) is set to 0.25. Moreover, it is preferable in order to further ensure the effects of the present embodiment that the lower limit of conditional expression (3) is set to 0.20.

Moreover, it is desirable that the imaging lens SL according to the present embodiment satisfies the following conditional expression (4):

$$0.40 < X1/f < 0.90 \quad (4)$$

where X1 denotes an absolute value of the moving amount of the first lens group G1 along the optical axis upon focusing on the nearest-distance object point from the infinite-distance object point, and f denotes a focal length of the imaging lens.

Conditional expression (4) is an expression, which specifies the moving amount of the first lens group G1 from the infinite-distance object point to the nearest-distance object point by using the focal length with respect to the maximum total lens length of the imaging lens. When the value X1/f is equal to or exceeds the upper limit of the conditional expression (4), the optical system becomes a system that has a large total lens length and a heavy weight and takes a considerable period of time for feeding. Alternatively, the shooing magnification becomes excessively small for a variation in the total lens length, and the macro lens cannot be configured. Further, there occurs an excessively large distance between the second lens group G2 and the third lens group G3 with the result that astigmatism becomes hard to be corrected, which is an undesirable point. Further, it is preferable in order to ensure the effects of the present embodiment that the upper limit of conditional expression (4) is set to 0.74. On the other hand, when the value X1/f is equal to or falls below the lower limit of conditional expression (4), the variation in the total lens length becomes small, however, power of each lens group increases corresponding to that degree, resulting in an increase in an amount of aberration. In particular, coma generates as the shooing magnification increases, and it becomes difficult to correct coma, which is an undesirable point. Moreover, it is preferable in order to ensure the effects of the present embodiment that the lower limit of conditional expression (4) is set to 0.50.

Moreover, it is desirable that the imaging lens SL according to the present embodiment satisfies the following conditional expression (5):

$$0.35 < f/TL < 1.20 \quad (5)$$

where TL denotes a total lens length upon focusing on an infinite-distance object point, and f denotes a focal length of the imaging lens.

Conditional expression (5) is an expression which specifies a proper ratio of the total lens length to the focal length upon focusing on the infinite-distance object point to determine a length of the lens barrel when retracted. When the value f/TL is equal to or exceeds the upper limit of conditional expression (5), the total lens length becomes too small with the difficulty of well correcting aberrations all over the areas from the infinite-distance object point to the near-distance object point. The image plane at the nearest object point becomes hard to be corrected, and coma cannot be corrected on the whole, which is an undesirable point. Further, it is preferable in order to ensure the effects of the present embodiment that the upper limit of conditional expression (5) is set to 0.51. On the other hand, when the value f/TL is equal to or falls below the lower limit of conditional expression (5), the total lens length becomes excessively short for the focal length, and the first lens group G1 and the third lens group G3 are spaced away from each other, with the result that it is difficult to ensure the sufficient angle of view and the sufficient brightness, which is an undesirable point. Moreover, it is preferable in order to ensure the effects of the present embodiment that the lower limit of conditional expression (5) is set to 0.41.

Further, in the imaging lens SL according to the present embodiment, the first lens group G1 includes, in order from the object side, the negative lens L11 with a concave surface directed to the image side and the positive lens L12, and satisfies the following conditional expression (6):

$$0.90 < (r2+r1)/(r2-r1) < 2.50 \qquad (6)$$

where r1 denotes a radius of curvature of the surface closest to the image side of the negative lens L11, and r2 denotes a radius of curvature of the surface closest to the object side of the positive lens L12.

Conditional expression (6) is an expression given in the case of expressing, when a distance between the negative lens L11 and the positive lens L12 each included within the first lens group G1 is considered to be an air lens, a shape of this air lens in a shape factor formula, in which the shape is a positive meniscus shape having a slightly strong convex surface on the object side and a slightly gentle concave surface on the image side. The light beams emerging from the negative lens L11 positioned closest to the object side are received by the lens taking the gentle shape defined in the range of this conditional expression (6), thereby restraining a sharp change in angle of the light beams from the infinite-distance object point to the near-distance object point and enabling coma to be well corrected.

When the value (r2+r1)/(r2-r1) is equal to or exceeds the upper limit of conditional expression (6), the radius-of-curvature r1 of the surface closest to the image side of the negative lens L11 or the radius-of-curvature r2 of the surface closest to the object side of the positive lens L12 becomes too small, and the two lens surfaces interfere with each other. Moreover, upon focusing on the near-distance object point from the infinite-distance object point, variation in coma becomes large, which is an undesirable point. Further, it is preferable in order to ensure the effects of the present embodiment that the upper limit of conditional expression (6) is set to 2.35. Moreover, it is preferable in order to further ensure the effects of the present embodiment that the upper limit of conditional expression (6) is set to 2.10. On the other hand, when the value (r2+r1)/(r2-r1) is equal to or falls below the lower limit of conditional expression (6), on-axis chromatic aberration at g-line and the lateral chromatic aberration thereof get deteriorated, which is an undesirable point. Further, it is preferable in order to ensure the effects of the present embodiment that the lower limit of conditional expression (6) is set to 1.20. Moreover, it is preferable in order to further ensure the effects of the present embodiment that the lower limit of conditional expression (6) is set to 1.51.

The imaging lens SL according to the present embodiment, it is desirable, satisfies the following conditional expression (7):

$$0.30 < f \times (-\beta)/f2 < 1.50 \qquad (7)$$

where β denotes shooing magnification upon focusing on the nearest object point, f denotes a focal length of the imaging lens, and f2 denotes a focal length of the second lens group G2.

Conditional expression (7) is an expression which specifies a proper ratio of the focal length of the second lens group G2 to the focal length of the imaging lens. When the value f×(−β)/f2 is equal to or exceeds the upper limit of conditional expression (7), the focal length of the second lens group G2 becomes too short, and it becomes difficult to correct spherical aberration and coma, which is an undesirable point. Further, it is preferable in order to ensure the effects of the present embodiment that the upper limit of conditional expression (7) is set to 1.4. Moreover, it is preferable in order to further ensure the effects of the present embodiment that the upper limit of conditional expression (7) is set to 1.3. On the other hand, when the value f×(−β)/f2 is equal to or falls below the lower limit of conditional expression (7), a working distance upon focusing on the near-distance object point cannot be ensured due to the excessively short focal length. Further, it is undesirable because of being unfeasible to ensure the sufficient shooting magnification and to configure the macro lens. Furthermore, it is preferable in order to ensure the effects of the present embodiment that the lower limit of conditional expression (7) is set to 0.5. Moreover, it is preferable in order to further ensure the effects of the present embodiment that the lower limit of the conditional expression (7) is set to 0.7.

Further, in the imaging lens SL according to the present embodiment, it is desirable that the first lens group G1 is composed of, in order from the object side, a front group G1F that has negative refractive power in combination and includes a negative lens L11 with a concave surface directed to the image side and a positive lens L12, and a rear group G1R that has positive refractive power in combination and is disposed on the image side of the front group G1F. With this configuration, the front group G1F restrains a distortion from being generated, whereby the balance of the aberrations from the infinite-distance object point to the near-distance object point can be taken. Moreover, the various aberrations can be well corrected with the balance between the front group G1F and the rear group G1R.

Moreover, it is desirable that the first lens group G1 composed of the front group G1F and the rear group G1R satisfies the following conditional expressions (8) through (10):

$$0.05 < fp/(-fn) < 0.60 \qquad (8)$$

$$0.04 < f/(-fn) < 0.40 \qquad (9)$$

$$0.07 < f/fp < 0.80 \qquad (10)$$

where fn denotes a focal length of the front group G1F, and fp denotes a focal length of the rear group G1R.

Conditional expression (8) is an expression which specifies a ratio of the focal length of the front group G1F of the first lens group G1 to the focal length of the rear group G1R thereof. When the value fp/(−fn) is equal to or exceeds the upper limit of conditional expression (8), spherical aberration cannot be thoroughly corrected because of the excessive strong power of the rear group G1R of the first lens group G1, and hence a fast optical system cannot be attained. Further, sensitivity in terms of manufacture becomes strict, which is an undesirable point. It is also preferable in order to ensure the effects of the present embodiment that the upper limit of conditional expression (8) is set to 0.50. Moreover, it is preferable in order to further ensure the effects of the present embodiment that the upper limit of conditional expression (8) is set to 0.40. On the other hand, when the value fp/(−fn) is equal to or falls below the lower limit of conditional expression (8), power of the front group G1F of the first lens group G1 gets intensified, power of the front group G1F of the first lens group G1 becomes strong, and, when the first lens group G1 moves upon focusing to the near-distance object point from the infinite-distance object point, behaviors of an angle of incidence and an angle of emergence of the light beams largely change, with the result that it is difficult to take the balance of coma and the balance of the aberrations all over the areas such as variation in curvature of field, which is an undesirable point. Further, it is preferable in order to ensure the effects of the present embodiment that the lower limit of conditional expression (8) is set to 0.07. Moreover, it is preferable in order to further ensure the effects of the present embodiment that the lower limit of conditional expression (8) is set to 0.10.

Conditional expression (9) is an expression which specifies a proper ratio of a combined focal length of the front group G1F of the first lens group G1 by use of the focal length of the imaging lens. When the value f/(−fn) is equal to or exceeds the upper limit of conditional expression (9), power of the front group G1F in the first lens group G1 is excessively strong for the focal length of the imaging lens, and the near-distance fluctuation cannot be restrained. Furthermore, an Abbe number of the negative lens L11 disposed closest to the object side in the first lens group G1 tends to become small, and the chromatic aberration becomes hard to be corrected. Moreover, the front group G1F in the first lens group G1 has strong power, and, when the first lens group G1 moves to the near-distance object point from the infinite-distance object point, the behaviors of the angle of incidence and the angle of emergence of the light beams largely change, with the result that it is difficult to correct aberrations all over the areas, which is an undesirable point. Further, it is preferable in order to ensure the effects of the present embodiment that the upper limit of conditional expression (9) is set to 0.30. Moreover, it is preferable in order to further ensure the effects of the present embodiment that the upper limit of conditional expression (9) is set to 0.20. On the other hand, when the value f/(−fn) is equal to or falls blow the lower limit of conditional expression (9), power of the front group G1F in the first lens group G1 becomes excessively weak for the focal length of the imaging lens, the total lens length and the imaging lens become large, and it follows that the moving amount of the first lens group G1 increases. Moreover, when power of the front group G1F of the first lens group G1 becomes too weak for the focal length of the imaging lens, coma occurs in the light rays traveling on a lower side than the principal ray, which is an undesirable point.

Conditional expression (10) is an expression which specifies a proper ratio of the combined focal length of the rear group G1R of the first lens group G1 by using the focal length of the imaging lens. When the value f/fp is equal to or exceeds the upper limit of conditional expression (10), power of the rear group G1R of the first lens group G1 becomes excessively weak for the focal length of the imaging lens, and spherical aberration and coma cannot be restrained, which is an undesirable point. Further, it is preferable in order to ensure the effects of the present embodiment that the upper limit of conditional expression (10) is set to 0.70. Moreover, it is preferable in order to further ensure the effects of the present embodiment that the upper limit of conditional expression (10) is set to 0.60. On the other hand, when the value f/fp is equal to or falls below the lower limit of conditional expression (10), upon keeping the same focal length with the same total lens length, the front group G1F of the first lens group G1 becomes a lens group having positive refractive power, and spherical aberration is curved. Moreover, a Petzval sum becomes excessively large, and curvature of field is displaced on a minus side, which is an undesirable point. Further, it is preferable in order to ensure the effects of the present embodiment that the lower limit of conditional expression (10) is set to 0.15. Moreover, it is preferable in order to further ensure the effects of the present embodiment that the lower limit of conditional expression (10) is set to 0.20.

Furthermore, in the imaging lens SL according to the present embodiment, it is desirable that the third lens group G3 includes at least one negative lens L31 and at least one of the positive lenses L32 through L34. Further, it is desirable that the third lens group G3 is composed of four lenses or less. Moreover, the third lens group G3 includes, it is desirable, the positive lens L34 closest to the image side. This configuration enables an exit pupil to be located far away and facilitates the correction of coma etc.

Moreover, in the imaging lens SL according to the present embodiment, it is desirable that the third lens group G3 is fixed with respect to the image plane upon focusing. This configuration enables coma to be corrected upon focusing on the near-distance object point and facilitates the construction of the lens barrel.

Furthermore, an imaging lens viewed from another aspect according to the present embodiment is composed of, in order from the object side, a first lens group having positive refractive power, a second lens group having positive refractive power and a third lens group having negative refractive power. Moreover, the first lens group includes a negative meniscus lens disposed closest to the object side with a concave surface directed to an image side, and has an aperture stop between the first lens group and the second lens group. Further, the imaging lens according to the present embodiment is configured so that the first lens group and the second lens group move while changing distances therebetween upon focusing on a near-distance object point from an infinite-distance object point.

Thus, in the imaging lens viewed from another aspect according to the present embodiment, the third lens group having negative refractive power receives the light beams converged by the lens groups having positive refractive power including the first lens group and the second lens group, thereby reducing the total lens length and simplifying the lens barrel mechanism.

Further, in the imaging lens viewed from another aspect according to the present embodiment, at least one surface of the optical surfaces of the first lens group is provided with an antireflection coating, and this antireflection coating contains at least one layer formed by use of a wet process. With the configuration being thus made, the imaging lens according to the present embodiment is capable of further reducing ghost images and flare caused by reflections of light from the object on the optical surfaces and attaining the high optical performance.

Moreover, in the imaging lens viewed from another aspect according to the present embodiment, it is desirable that the antireflection coating is a multi-layered film, and the layer formed by the wet process is a layer of the uppermost surface of the layers composing the multi-layered film. If thus contrived, a difference in refractive index from the air can be decreased, and hence it is possible to further decrease the light reflection and reduce ghost images and flare as well.

Furthermore, in the imaging lens viewed from another aspect according to the present embodiment, let nd be a refractive index of a layer formed by use of the wet process, and it is desirable that the refractive index nd is equal to or smaller than 1.30. If thus set, the difference in refractive index from the air can be decreased, and it is therefore to further lessen light reflection and reduce ghost images and flare as well.

Further, in the imaging lens viewed from another aspect according to the present embodiment, it is desirable that the optical surface is a concave surface as viewed from the aperture stop. The concave surface as viewed from the aperture stop facilitates generation of ghost images, and therefore the optical surface is formed with the antireflection coating, thereby enabling ghost images and flare to be effectively reduced.

Furthermore, in the imaging lens viewed from another aspect according to the present embodiment, it is desirable that the concave surface as viewed from the aperture stop is disposed to the image side of the aperture stop. Ghost images are easy to occur on the concave surface with respect to the aperture stop, and hence this optical surface is formed with the antireflection coating, whereby ghost images and flare can be effectively reduced.

Moreover, in the imaging lens viewed from another aspect according to the present embodiment, it is desirable that the concave surface as viewed from the aperture stop is disposed to the object side of the aperture stop. Ghost images are easy to occur on the concave surface as viewed from the aperture stop, and hence this optical surface is formed with the antireflection coating, whereby ghost images and flare can be effectively reduced.

Further, in the imaging lens viewed from another aspect according to the present embodiment, it is desirable that the concave surface as viewed from the aperture stop is a lens surface of the lens closest to the object side. Ghost images are easy to occur on the concave surface as viewed from the aperture stop, and hence this optical surface is formed with the antireflection coating, whereby ghost images and flare can be effectively reduced.

Moreover, in the imaging lens viewed from another aspect according to the present embodiment, it is desirable that the concave surface as viewed from the aperture stop is a lens surface of the image side second lens counted from the lens closest to the object side. Ghost images are easy to occur on the concave surface as viewed from the aperture stop, and hence this optical surface is formed with the antireflection coating, whereby ghost images and flare can be effectively reduced.

It should be noted that in the imaging lens viewed from another aspect according to the present embodiment, the antireflection coating may also be formed by a dry process etc without being limited to the wet process. On this occasion, it is preferable that the antireflection coating contains at least one layer of which the refractive index is equal to or smaller than 1.30. Thus, the same effects as in the case of employing the wet process can be acquired by forming the antireflection coating based on the dry process etc. Note that at this time the layer of which the refractive index is equal to or smaller than 1.30 is, it is preferable, the layer of the uppermost surface of the layers composing the multi-layered film.

Furthermore, it is desirable that the imaging lens viewed from another aspect according to the present embodiment satisfies the following conditional expression (1):

$$0.50 \leq (-\beta) \tag{1}$$

where $\beta$ denotes shooing magnification upon focusing on the nearest object point.

Conditional expression (1) specifies the shooing magnification upon focusing on the nearest object point, however, the description thereof has already been made, and hence the redundant explanation is omitted.

Further, it is desirable that the imaging lens viewed from another aspect according to the present embodiment satisfies the following conditional expression (2):

$$0.07 < f2/f1 < 0.35 \tag{2}$$

where f1 denotes a focal length of the first lens group, and f2 denotes a focal length of the second lens group.

Conditional expression (2) specifies the ratio of the focal length of the first lens group to the focal length of the second lens group, however, the description thereof has already been made, and hence the redundant explanation is omitted.

Moreover, it is desirable that in the imaging lens viewed from another aspect according to the present embodiment, the first lens group includes, in order from the object side, a negative lens with a concave surface directed to the image side, a first positive lens and a second positive lens, and satisfies the following conditional expression (3):

$$0.10 < Da/Db < 2.00 \tag{3}$$

where Da denotes a distance along the optical axis between the surface closest to the image side of the negative lens and the surface closest to the object side of the second positive lens, and Db denotes a distance along the optical axis between the surface closest to the image side of the first positive lens and the surface closest to the object side of the second positive lens.

Conditional expression (3) is an expression which specifies a proper proportion with respect to a ratio of a distance between the negative lens disposed closest to the object side among the first lens group and the first positive lens disposed on the image side thereof to a distance between the first positive lens and the second positive lens disposed on the image side thereof, however, the description thereof has already been made, and hence the redundant explanation is omitted.

Further, it is desirable that the imaging lens viewed from another aspect according to the present embodiment satisfies the following conditional expression (4):

$$0.40 < X1/f < 0.90 \tag{4}$$

where X1 denotes an absolute value of a moving amount of the first lens group along the optical axis upon focusing on the near-distance object point from the infinite-distance object point, and f denotes a focal length of the imaging lens.

Conditional expression (4) is an expression which specifies the absolute value of the moving amount of the first lens group from the infinite-distance object point to the near-distance object point by use of the focal length of the imaging lens of the imaging lens, however, the description thereof has already been made, and hence the redundant explanation is omitted.

Furthermore, it is desirable that the imaging lens viewed from another aspect according to the present embodiment satisfies the following conditional expression (5):

$$0.35 < f/TL < 1.20 \tag{5}$$

where TL denotes a total lens length in the infinite-distance focusing state, and f denotes a focal length of the imaging lens.

Conditional expression (5) is an expression which specifies a proper ratio of the total lens length at the infinite-distance focusing state to the focal length of the imaging lens for determining a length of the lens barrel when retracted, however, the description thereof has already been made, and hence the redundant explanation is omitted.

Moreover, it is desirable that in the imaging lens viewed from another aspect according to the present embodiment, the first lens group includes, in order from the object side, a negative lens with a concave surface directed to the image side and a positive lens, and satisfies the following conditional expression (6):

$$0.90<(r2+r1)/(r2-r1)<2.50 \quad (6)$$

where r1 denotes a radius of curvature of the surface closest to the image side of the negative lens, and r2 denotes a radius of curvature of the surface closest to the object side of the positive lens.

Conditional expression (6) is an expression given in the case of expressing, when a distance between the negative lens and the positive lens each included in the first lens group is considered to be an air lens, a shape of this air lens in a shape factor formula, however, the description thereof has already been made, and hence the redundant explanation is omitted.

Further, it is desirable that the imaging lens viewed from another aspect according to the present embodiment satisfies the following conditional expression (7):

$$0.30<f\times(-\beta)/f2<1.50 \quad (7)$$

where β denotes shooing magnification upon focusing on the nearest object point, f denotes a focal length of the imaging lens, and f2 denotes a focal length of the second lens group.

The conditional expression (7) is an expression which specifies a proper ratio of the focal length of the second lens group to the focal length of the imaging lens, however, the description thereof has already been made, and hence the redundant explanation is omitted.

Furthermore, it is desirable that in the imaging lens viewed from another aspect according to the present embodiment, the first lens group includes, in order from the object side, a front group that has negative refractive power in combination and includes a negative lens with a concave surface directed to the image side and a positive lens, and a rear group that has positive refractive power in combination and is disposed on the image side of the front group. With this configuration, a height of the incidence of off-axis light beams at the first lens group can be suppressed, and hence it is feasible to correct angle of view dependent aberrations such as coma and astigmatism and to well correct spherical aberration etc with the second lens group.

Further, it is desirable that the first lens group, which is thus constructed of the front group and the rear group, satisfies the following conditional expressions (8) through (10):

$$0.05<fp/(-fn)<0.60 \quad (8)$$

$$0.04<f/(-fn)<0.40 \quad (9)$$

$$0.07<f/fp<0.80 \quad (10)$$

where fn denotes a focal length of the front group, fp denotes a focal length of the rear group, and f denotes a focal length of the imaging lens.

Conditional expressions (8) through (10) have already been described, and therefore the redundant explanations are omitted.

Figure 10:
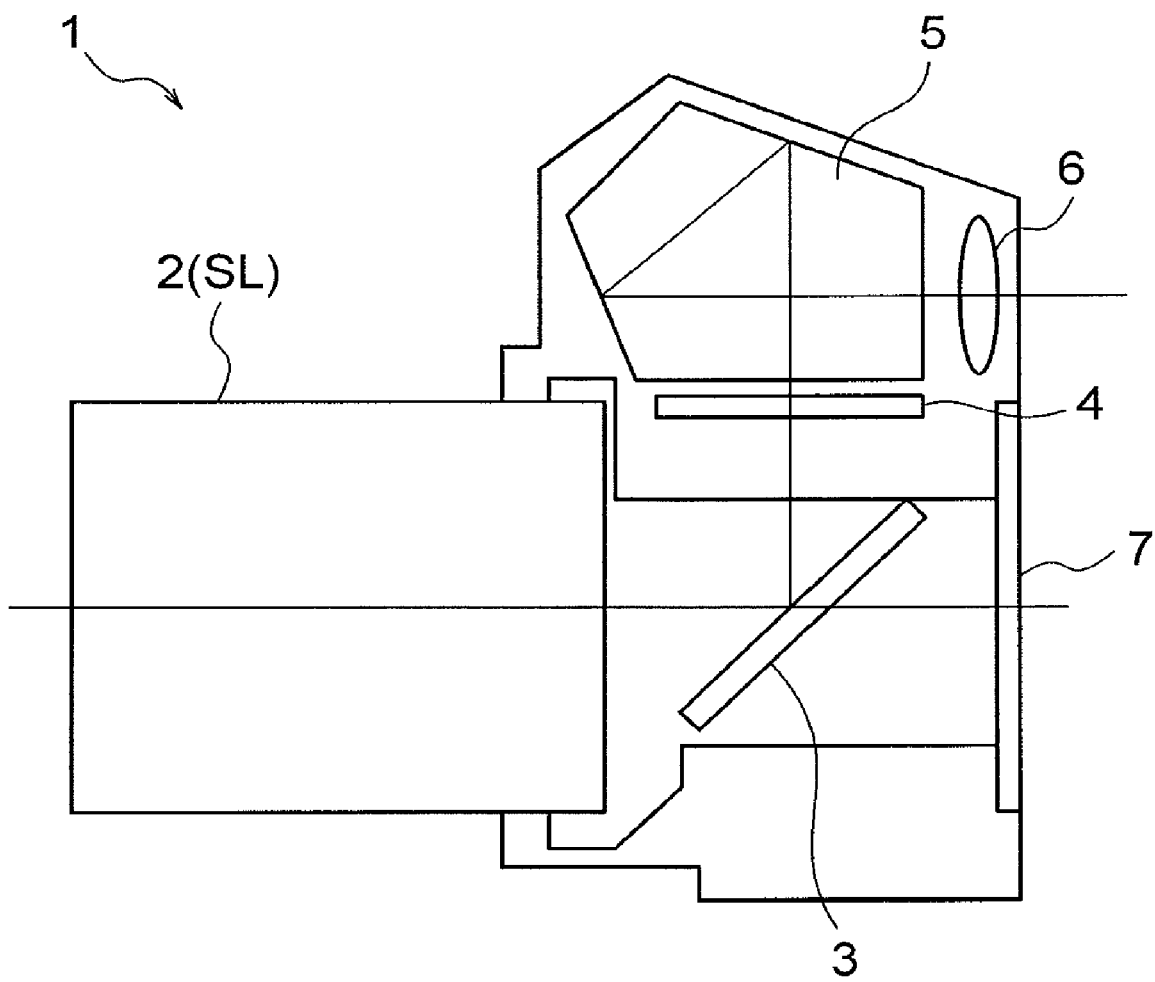
FIG. 10 is a sectional view of a single-lens reflex digital camera mounted with the imaging lens according to the present embodiment.

FIG. 10 shows a schematic sectional view of a single-lens reflex digital camera 1 (which will hereinafter simply be termed a camera) by way of an optical apparatus including the imaging lens SL exemplified in Example 1 that will be discussed later on. In the camera 1, light rays from an unillustrated object (an object to be imaged) are converged by an imaging lens 2 (the imaging lens SL), and an image is formed on a focusing screen 4 via a quick return mirror 3. Then, the light rays, of which the image is formed on the focusing screen 4, are reflected plural times within a pentagonal roof prism 5 and led town eyepiece 6. A photographer is thereby capable of observing the object (the object to be imaged) as an erect image via the eyepiece 6.

Moreover, when the photographer presses an unillustrated release button, the quick return mirror 3 retreats outside of an optical path, and the light rays from the unillustrated object (the object to be imaged), which are converged by the imaging lens 2, form an object image on an imaging device 7. The image of the light rays from the object (the object to be imaged) is thereby formed by the imaging device 7 and recorded as an image of the object (the object to be imaged) in an unillustrated memory. Thus, the photographer can photograph the object (the object to be imaged) by use of the present camera 1. Note that the camera 1 illustrated in FIG. 10 may be constructed to retain the imaging lens SL in an attachable/detachable manner and may also be constructed integrally with the imaging lens SL. Moreover, the camera 1 may be constructed as a so-called single lens reflex camera and may also be constructed as a compact camera (mirror-less camera) including none of the quick return mirror. Further, the camera 1 can be mounted with imaging lenses according to other Examples without being limited to Example 1 discussed later.

Figure 11:
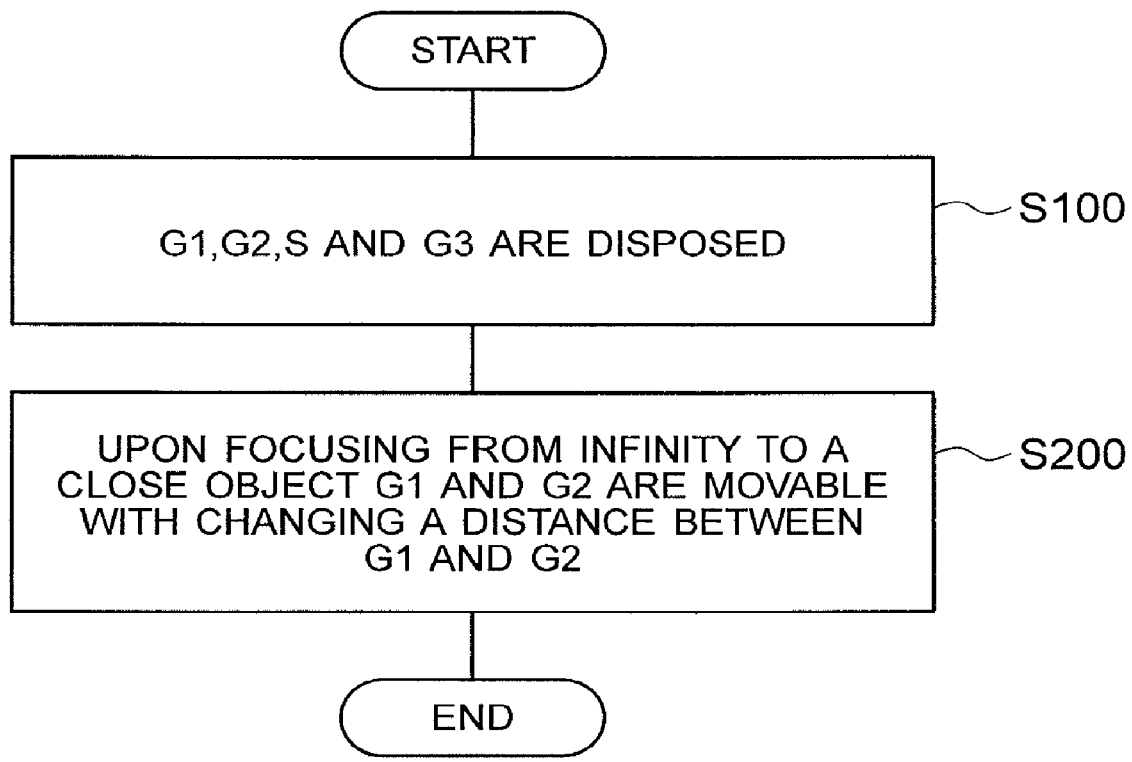
FIG. 11 is an explanatory flowchart of a method for manufacturing the imaging lens according to the present embodiment.

Subsequently, an outline of a method for manufacturing an imaging lens according to the present embodiment will hereinafter be described with reference to FIG. 11. To start with, the lens groups are prepared by disposing the respective lenses (step S100). To be specific, in the present embodiment, e.g., in the case of Example 1, a first lens group G1 is composed of disposing, in order from an object side, a negative meniscus lens L11 with a concave surface directed to an image side, a double convex positive lens L12, a double convex positive lens L13, and a double concave negative lens L14. Further, a second lens group G2 is composed of disposing, in order from the object side, a cemented lens constructed by a double concave negative lens L21 cemented with a double convex positive lens L22, and a double convex positive lens L23. Moreover, a third lens group G3 is composed of disposing, in order from the object side, a negative meniscus lens L31 with a concave surface directed to the image side and a positive meniscus lens L32 with a concave surface directed to the object side. Further, an aperture stop S is so constructed as to be disposed between the first lens group G1 and the second lens group G2. The imaging lens SL is manufactured by disposing the thus-prepared lenses into a lens barrel.

At this time, upon focusing on a near-distance object point from an infinite-distance object point, the first lens group G1 and the second lens group G2 are disposed in a way that move to the object side while varying a distance between these lens groups (step S200). With the operation described so far, the manufacture of the imaging lens is completed.

Each of Examples according to the present embodiment will hereinafter be described with reference to accompanying drawings. Note that FIGS. 1, 4, 6 and 8 illustrate how the refractive power of imaging lenses SL1 through SL4 is distributed and how the respective lens groups are shifted in a change of the focal length state from an infinite-distance focusing state (INF) to shooting magnification of −1.0 state (CLD). In the respective drawings, (INF) represents each lens group in the infinite-distance focusing state, (MID) indicates each lens group in shooting magnification of −0.5 state, and (CLD) represents each lens group in shooting magnification of −1.0 state, respectively. As shown in these drawings, each of the imaging lenses SL1 through SL4 in each Example is composed of, in order from the object side, a first lens group G1 having positive refractive power, an aperture stop S, a second lens group G2 having positive refractive power and a third lens group G3 having negative refractive power. Further, the first lens group G1 is composed of, in order from the object side, a front group G1F having negative refractive power and a rear group G1R having positive refractive power.

Moreover, in Examples 1, 3 and 4, a low pass filter P1 for cutting a spatial frequency equal to or larger than a limit resolution of a solid-state imaging device such as a CCD (Charge Coupled Device) disposed on an image plane I, is provided between the third lens group G3 and the image plane I.

In each of Examples, the aspherical surface is expressed by the following expression (a) when y is a height in the direction vertical to the optical axis, S(y) is a distance (sag quantity) along the optical axis from a tangent plane of a vertex of each aspherical surface at the height y up to each aspherical surface, r is a radius of curvature (paraxial radius of curvature) of the reference sphere, k is a conical coefficient and An is an n-th order aspherical surface coefficient. Note that [E−n] represents [×10$^{-n}$] in the subsequent working examples:

$$S(y)=(y^2/r)/[1+(1-k\times y^2/r^2)^{1/2}]+A4\times y^4+A6\times y^6+A8\times y^8+A10\times y^{10} \quad (a).$$

It should be noted that a second order aspherical surface coefficient A2 is "0" in each of Examples. Further, the aspherical surface is attached with a mark "*" on the left side of a surface number in the Table of each Example.

<Example 1>

FIG. 1 is a sectional view showing a lens configuration of an imaging lens SL1 according to Example 1. In the imaging lens SL1 according to Example 1, the first lens group G1 having positive refractive power on the whole is composed of, in order from the object side, a front group G1F having negative refractive power and a rear group G1R having positive refractive power. Further, the front group G1F is composed of, in order from the object side, two lenses such as a negative meniscus lens L11 with a concave surface directed to the image side and a double convex positive lens L12, and the rear group G1R is composed of, in order from the object side, two lenses such as a double convex positive lens L13 and a double concave negative lens L14.

The second lens group G2 having positive refractive power on the whole is composed of, in order from the object side, three lenses such as a cemented lens constructed by a double concave negative lens L21 cemented with a double convex positive lens L22, and a double convex positive lens L23.

The third lens group G3 having negative refractive power on the whole is composed of, in order from the object side, two lenses such as a negative meniscus lens L31 with a concave surface directed to the image side and a positive meniscus lens L32 with a concave surface directed to the object side.

Further, an aperture stop S is disposed between the first lens group G1 and the second lens group G2, and, upon focusing on a near-distance object point from an infinite-distance object point, moves to the object side together with the second lens group G2.

In the imaging lens SL1 according to Example 1, the object-sided lens surface of the negative meniscus lens L11 of the first lens group G1 and the object-sided lens surface of the double convex positive lens L12 are formed with antireflection coatings which will be described later on.

The following Table 1 shows values of various items of data of the imaging lens SL1 according to Example 1. In [Specifications], f denotes a focal length, FNO denotes an f-number, Bf denotes a distance from the most image side lens surface of the optical element to the image plane I, and 2ω denotes an angle of view (unit: degree), respectively.

In [Lens Data] of the Table 1, a surface number "i" represents an order of the lens surface from the object side along the direction in which the light beams travel, "r" denotes a radius of curvature of each optical surface, a distance "d" indicates a distance along an optical axis from each optical surface to the next optical surface, and an Abbe number "vd" and a refractive index "nd" represent values with respect to the d-line (wavelength λ=587.6 nm).

In [Aspherical Surface Data], k is a conical coefficient and An is an n-th order aspherical surface coefficient, respectively. Note that [E−n] represents [×10$^{-n}$].

Moreover, in [Variable Distances], variable distances in the infinite-distance focusing state (INF), shooting magnification (β) of −0.5 state (MID) and shooting magnification (β) of −1.0 state (CLD) are shown. Shown further are a total lens length TL, an air conversion total lens length ACTL and an air conversion ACBf (which is an air conversion value of the distance between the image-sided surface of the optical element having refractive power disposed closest to the image side and the image plane). The total lens length TL represents an on-axis distance from the first surface of the lens surfaces in the infinite-distance focusing state to the image plane I. Moreover, d0 indicates a distance along the optical axis between the object and the first lens group G1, d1a denotes a distance along the optical axis between the first lens group G1 and the aperture stop S, d1b represents a distance along the optical axis between the aperture stop S and the second lens group G2, and d2 indicates a distance along the optical axis between the second lens group G2 and the third lens group G3, respectively. Moreover, the on-axis air gap d1 is expressed such as d1=d1a+d1b.

In [Values for Conditional Expressions], β is maximum shooting magnification, f1 denotes a focal length of the first lens group G1, f2 denotes a focal length of the second lens group G2, Da denotes a distance along the optical axis between a surface closest to the image side of the negative meniscus lens L11 of the first lens group G1 and the surface closest to the object side of the double convex positive lens L12, Db denotes a distance along the optical axis between a surface closest to the image side of the double convex positive lens L12 and a surface closest to the object side of the double convex positive lens L13, f denotes a focal length of the imaging lens, X1 denotes an absolute value of a moving amount of the first lens group G1 along the optical axis upon focusing on the near-distance object point from the infinite-distance object point, TL denotes the total lens length in the infinite-distance focusing state, r1 denotes a radius of curvature of the surface closest to the image side of the negative meniscus lens L11, and r2 denotes a radius of curvature of the surface closest to the object side of the double convex positive lens L12, respectively.

The focal length, the radius of curvature, the surface distance and other items of data described in the following various items of whole data involve using generally [mm] as a unit of the length, however, the optical system acquires the equal optical performance even when proportionally enlarged or reduced and is not therefore limited to this unit. Incidentally, the radius of curvature "r=∞" indicates a plane surface, and the refractive index "nd=1.00000" of the air is omitted. Note that the descriptions of the reference numerals and symbols and the various items of data are the same in the subsequent Examples, and their explanations in the subsequent working examples are omitted.

TABLE 1

[Specifications]

| | |
|---|---|
| f = | 40.00 |
| Bf = | 37.65 (constant) |
| FNO = | 2.68 |
| 2ω = | 39.0 |

[Lens Data]

| i | r | d | νd | nd |
|---|---|---|---|---|
| 1 | 177.4342 | 2.000 | 70.40 | 1.48749 |
| 2 | 15.9007 | 3.530 | | |
| 3 | 63.8566 | 5.000 | 40.77 | 1.80604 |
| 4 | −72.9715 | 6.961 | | |
| 5 | 31.3195 | 5.000 | 58.73 | 1.61272 |
| 6 | −25.7820 | 0.678 | | |
| 7 | −40.2105 | 2.000 | 37.00 | 1.61293 |
| 8 | 23.7239 | (d1a) | | |
| 9 | ∞ | (d1b) | Aperture Stop S | |
| 10 | −13.8798 | 1.200 | 37.00 | 1.61293 |
| 11 | 186.0079 | 3.710 | 60.29 | 1.62041 |
| 12 | −18.9606 | 0.100 | | |
| 13 | 80.2528 | 3.445 | 63.73 | 1.61881 |
| 14* | −25.3622 | (d2) | | |
| 15 | −311.9251 | 1.200 | 70.40 | 1.48749 |
| 16 | 31.2577 | 1.550 | | |
| 17 | −1620.7830 | 2.550 | 44.79 | 1.74400 |
| 18 | −66.5158 | 0.100 | | |
| 19 | 0.0000 | 2.000 | 64.12 | 1.51680 |
| 20 | 0.0000 | (Bf) | | |

[Aspherical Surface Data]
Surface number = 14

κ = 0.3210
A4 = 4.54813E−06
A6 = 5.40478E−09
A8 = −5.17090E−12
A10 = 5.14254E−15

[Variable Distances]

| | INF | MID | CLD |
|---|---|---|---|
| β = | 0 | −0.5 | −1.0 |
| d0 = | ∞ | 80.4055 | 38.9287 |
| d1a = | 2.96840 | 3.21650 | 5.33230 |
| d1b = | 4.00000 | 4.00000 | 4.00000 |
| d1 = | 6.96840 | 7.21650 | 9.33230 |
| d2 = | 1.21000 | 13.37100 | 25.70880 |
| TL = | 86.85516 | 99.26436 | 113.71791 |
| ACTL = | 86.17372 | 98.58293 | 113.03648 |
| ACBf = | 36.97047 | 36.97047 | 36.97047 |

[Values for Conditional Expressions]

(1) (−β) = 1.000
(2) f2/f1 = 0.154
(3) Da/Db = 0.507
(4) X1/f = 0.672
(5) f/TL = 0.461
(6) (r2 + r1)/(r2 − r1) = 1.663
(7) fx(−β)/f2 = 1.173
(8) fp/(−fn) = 0.273
(9) f/(−fn) = 0.059
(10) f/fp = 0.215

FIGS. 2A, 2B, 2C are diagrams of various aberrations of the imaging lens according to Example 1; FIG. 2A is the diagram of the various aberrations in the infinite-distance in-focus state; FIG. 2B is the diagram of various aberrations in shooting magnification of −0.5 state; and FIG. 2C is the diagram of the various aberrations in shooting magnification of −1.0 state.

In each aberration diagram, FNO denotes an f-number, Y denotes an image height, d indicates an aberration curve with respect to d-line (λ=587.6 nm) and g indicates an aberration curve with respect to the g-line (λ=435.8 nm), respectively. Respective graphs showing spherical aberration, the f-number corresponding to the maximum aperture is shown. In respective graphs showing astigmatism and distortion, the maximum values of the image height Y are shown. In graphs showing coma, the values of the image height are shown. Moreover, in the aberration diagram showing the astigmatism, a solid line indicates a sagittal image plane, a broken line indicates a meridional image plane. Note that the descriptions of these aberration diagrams are the same with the subsequent Examples.

As obvious from these aberration diagrams, it is understood that the imaging lens SL1 according to Example 1 has excellent optical performance, in which the various aberrations are well corrected over a range from the infinite-distance focusing state to the near-distance photographing state.

FIG. 3 shows a state of how ghost images occurs from light beams BM entering from the object side in the imaging lens SL1 according to Example 1. In FIG. 3, when the light beams BM coming from the object side get incident on the imaging lens SL1 as illustrated in FIG. 3, the light beams BM are reflected by an object-sided lens surface (a first ghost-image-generating surface having a surface number "3") of the double convex positive lens L12, and the reflected light beams are again reflected by an object-sided lens surface (a second ghost occurrence surface having a surface number "1") of the negative meniscus lens L11 and reach the image plane I, resulting in the occurrence of the ghost. Note that the first ghost occurrence surface (the surface number "3") and the second ghost occurrence surface (the surface number "1") are defined as the concave lens surfaces with respect to the aperture stop. These surfaces are formed with the antireflection coating corresponding to a wide incident angle in a broader wavelength range, thereby enabling ghost images to be effectively reduced.

<Example 2>

FIG. 4 is a sectional view showing a lens configuration of an imaging lens SL2 according to Example 2. In the imaging lens SL2 shown in FIG. 4, a first lens group G1 having positive refractive power on the whole is composed of, in order from an object side, a front group G1F having negative refractive power and a rear group G1R having positive refractive power. Further, the front group G1F is composed of, in order from the object side, two lenses such as a negative meniscus lens L11 with a concave surface directed to the image side and a double convex positive lens L12, and a rear group G1R is composed of, in order from the object side, two lenses such as a double convex positive lens L13 and a double concave negative lens L14.

The second lens group G2 having positive refractive power on the whole is composed of, in order from the object side, three lenses such as a cemented lens constructed by a double concave negative lens L21 cemented with a double convex positive lens L22, and a double convex positive lens L23.

The third lens group G3 having negative refractive power on the whole is composed of, in order from the object side, three lenses such as a negative meniscus lens L31, a double concave negative lens L32 and a double convex positive lens L33.

Further, an aperture stop S is disposed between the first lens group G1 and the second lens group G2, and, upon focusing on the near-distance object point from the infinite-distance object point, moves to the object side together with the second lens group G2.

In the imaging lens SL2 according to Example 2, the image-sided lens surface of the negative meniscus lens L11 of the first lens group G1 and the object-sided lens surface of the double convex positive lens L12 are formed with antireflection coatings which will be described later on.

The following Table 2 shows the values of various items of data of the imaging lens SL2 according to Example 2.

TABLE 2

[Specifications]

| | |
|---|---|
| f = | 40.00 |
| Bf = | 42.10 (constant) |
| FNO = | 2.80 |
| 2ω = | 39.2 |

[Lens Data]

| i | r | d | vd | nd |
|---|---|---|---|---|
| 1 | 38.6400 | 1.200 | 60.29 | 1.62041 |
| 2 | 14.6115 | 4.088 | | |
| 3 | 67.4515 | 2.559 | 27.51 | 1.75520 |
| 4 | −68.1015 | 7.094 | | |
| 5 | 29.5588 | 4.303 | 57.03 | 1.62280 |
| 6 | −24.8308 | 0.174 | | |
| 7 | −48.5997 | 1.200 | 33.80 | 1.64769 |
| 8 | 22.1617 | (d1a) | | |
| 9 | ∞ | (d1b) | Aperture Stop S | |
| 10 | −13.9430 | 1.200 | 33.80 | 1.64769 |
| 11 | 36.8604 | 4.373 | 48.08 | 1.70000 |
| 12 | −22.4714 | 0.100 | | |
| 13 | 81.7598 | 3.741 | 60.29 | 1.62041 |
| 14* | −22.1829 | (d2) | | |
| 15 | −86.3137 | 1.200 | 61.15 | 1.58887 |
| 16 | 26.6709 | 1.973 | | |
| 17 | −92.6459 | 1.200 | 39.22 | 1.59551 |
| 18 | 71.2964 | 0.100 | | |
| 19 | 43.7866 | 4.727 | 44.79 | 1.74400 |
| 20 | −42.6411 | (Bf) | | |

[Aspherical Surface Data]
Surface number = 14

κ = 0.3963
A4 = 9.62328E−06
A6 = 9.25444E−09
A8 = 1.06569E−11
A10 = 0.00000E+00

[Variable Distances]

| | INF | MID | CLD |
|---|---|---|---|
| β = | 0 | −0.5 | −1.0 |
| d0 = | ∞ | 80.7078 | 39.5433 |
| d1a = | 1.70000 | 2.56538 | 4.17576 |
| d1b = | 3.05000 | 3.05000 | 3.05000 |
| d1 = | 4.75000 | 5.61538 | 7.22576 |
| d2 = | 1.00000 | 10.95186 | 21.03119 |
| TL = | 87.08321 | 97.90046 | 109.59017 |
| ACTL = | 87.08321 | 97.90046 | 109.59017 |
| ACBf = | 42.10051 | 42.10051 | 42.10051 |

[Values for Conditional Expressions]

(1) (−β) = 1.000
(2) (f2/f1) = 0.154
(3) Da/Db = 0.576
(4) X1/f = 0.563
(5) f/TL = 0.459
(6) (r2 + r1)/(r2 − r1) = 1.553
(7) f × (−β)/f2 = 1.270
(8) fp/(−fn) = 0.232
(9) f/(−fn) = 0.052
(10) f/fp = 0.224

Figure 5A:
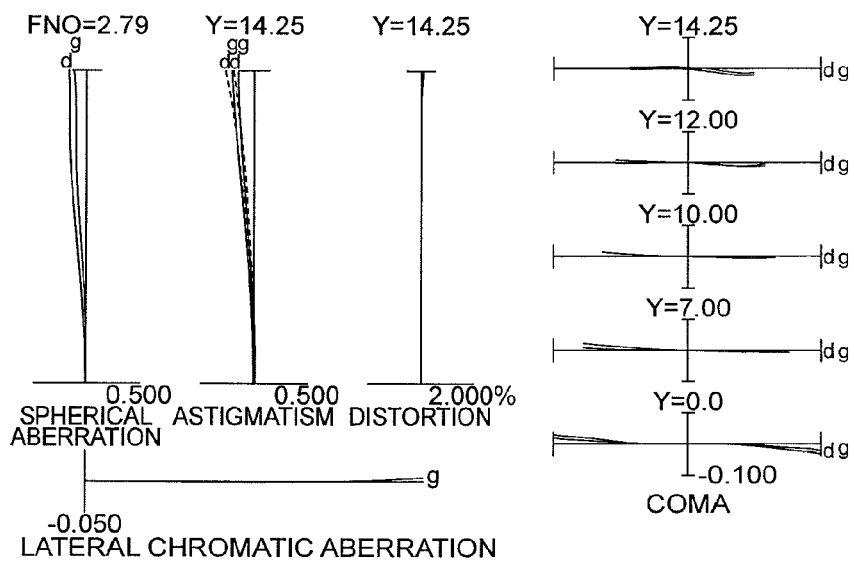
FIGS. 5A, 5B, 5C are diagrams of the various aberrations of the imaging lens according to Example 2.
Figure 5B:
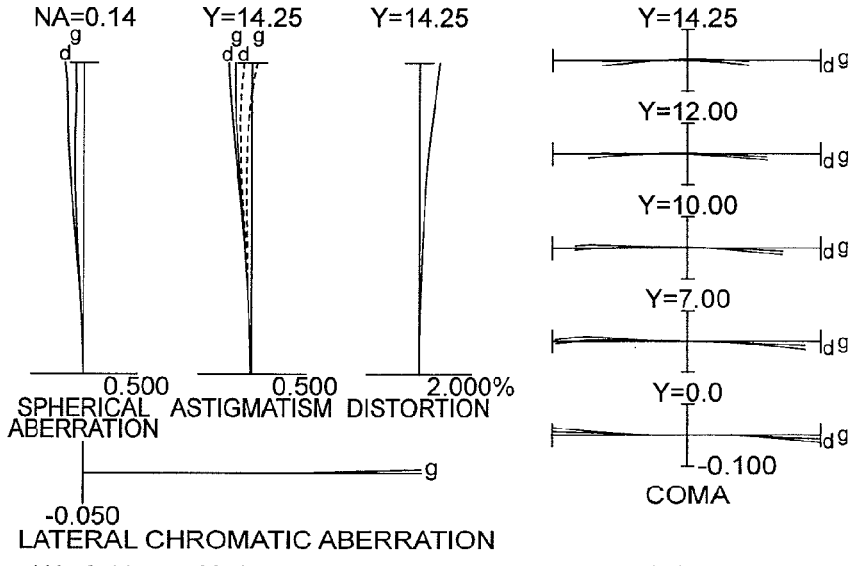
Figure 5C:
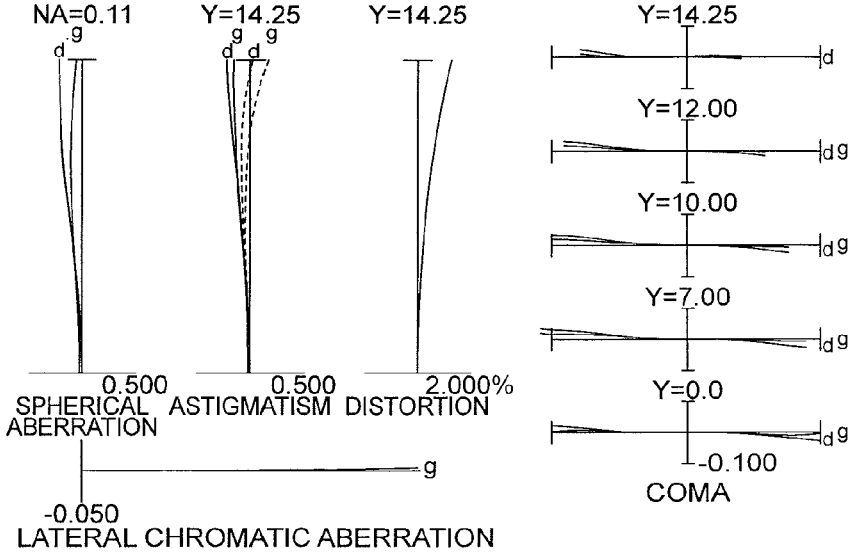

FIGS. 5A, 5B, 5C are diagrams of the various aberrations of the imaging lens according to Example 2; FIG. 5A is the diagram of the various aberrations in the infinite-distance in-focus state; FIG. 5B is the diagram of various aberrations in shooting magnification of −0.5 state; and FIG. 5C is the diagram of the various aberrations in shooting magnification of −1.0 state.

As obvious from these aberration diagrams, it is understood that the imaging lens SL2 according to Example 2 has excellent optical performance, in which the various aberrations are well corrected over the range from the infinite-distance focusing state to the near-distance photographing state.

<Example 3>

FIG. 6 is a sectional view showing a lens configuration of an imaging lens SL3 according to Example 3. In the imaging lens SL3 in FIG. 6, a first lens group G1 having positive refractive power on the whole is composed of, in order from an object side, a front group G1F having negative refractive power and a rear group G1R having positive refractive power. Further, the front group G1F is composed of, in order from the object side, two lenses such as a negative meniscus lens L11 with a concave surface directed to the image side and a double convex positive lens L12, and a rear group G1R is composed of, in order from the object side, two lenses such as a double convex positive lens L13 and a double concave negative lens L14.

The second lens group G2 having positive refractive power on the whole is composed of, in order from the object side, three lenses such as a cemented lens constructed by a double concave negative lens L21 cemented with a double convex positive lens L22, and a double convex positive lens L23.

The third lens group G3 having negative refractive power on the whole is composed of, in order from the object side, two lenses such as a negative meniscus lens L31 with a concave surface directed to the image side and a double convex positive lens L32.

Further, an aperture stop S is disposed between the first lens group G1 and the second lens group G2, and, upon focusing on the near-distance object point from the infinite-distance object point, moves to the object side together with the first lens group G1.

In the imaging lens SL3 according to Example 3, both of the image side lens surface and the object side lens surface of the negative meniscus lens L11 of the first lens group G1 are formed with antireflection coatings which will be described later on.

The following Table 3 shows the values of various items of data of the imaging lens SL3 according to Example 3.

TABLE 3

[Specifications]

| | |
|---|---|
| f = | 39.28 |
| Bf = | 37.40 (constant) |
| FNO = | 2.89 |
| 2ω = | 39.9 |

[Lens Data]

| I | r | d | vd | nd |
|---|---|---|---|---|
| 1 | 66.2716 | 1.418 | 59.84 | 1.52249 |
| 2 | 13.9775 | 2.100 | | |
| 3 | 43.7571 | 3.136 | 34.96 | 1.80100 |
| 4 | −94.4864 | 6.897 | | |
| 5 | 27.6455 | 3.505 | 44.79 | 1.74400 |
| 6 | −25.2375 | 0.110 | | |
| 7 | −38.5571 | 1.084 | 33.79 | 1.64769 |
| 8 | 18.4448 | (d1a) | | |
| 9 | ∞ | (d1b) | Aperture Stop S | |

TABLE 3-continued

| 10 | −15.8877 | 2.788 | 32.11 | 1.67270 |
|---|---|---|---|---|
| 11 | 42.6316 | 5.000 | 50.70 | 1.67790 |
| 12 | −23.9294 | 0.280 | | |
| 13 | 81.7271 | 3.504 | 61.18 | 1.58913 |
| 14* | −23.6977 | (d2) | | |
| 15 | 1153.7120 | 1.001 | 64.12 | 1.51680 |
| 16 | 33.6937 | 1.274 | | |
| 17 | 37757.7137 | 2.795 | 35.92 | 1.66446 |
| 18 | −82.6158 | 0.100 | | |
| 19 | 0.0000 | 2.000 | 64.12 | 1.51680 |
| 20 | 0.0000 | (Bf) | | |

[Aspherical Surface Data]
Surface number = 14

$\kappa = 0.2972$
$A4 = 4.92425E{-}06$
$A6 = 7.19036E{-}09$
$A8 = -6.48152E{-}11$
$A10 = 1.69010E{-}13$

[Variable Distances]

| | INF | MID | CLD |
|---|---|---|---|
| β = | 0 | −0.5 | −1.0 |
| d0 = | ∞ | 80.3134 | 39.4435 |
| d1a = | 2.09400 | 2.09400 | 2.09400 |
| d1b = | 3.50000 | 4.80603 | 6.87863 |
| d1 = | 5.59400 | 6.90003 | 8.97263 |
| d2 = | 1.00000 | 12.75385 | 24.77361 |
| TL = | 80.98205 | 94.04193 | 108.13429 |
| ACTL = | 80.30062 | 93.36050 | 107.45286 |
| ACBf = | 38.81447 | 38.81447 | 38.81447 |

[Values for Conditional Expressions]

Figure 7A:
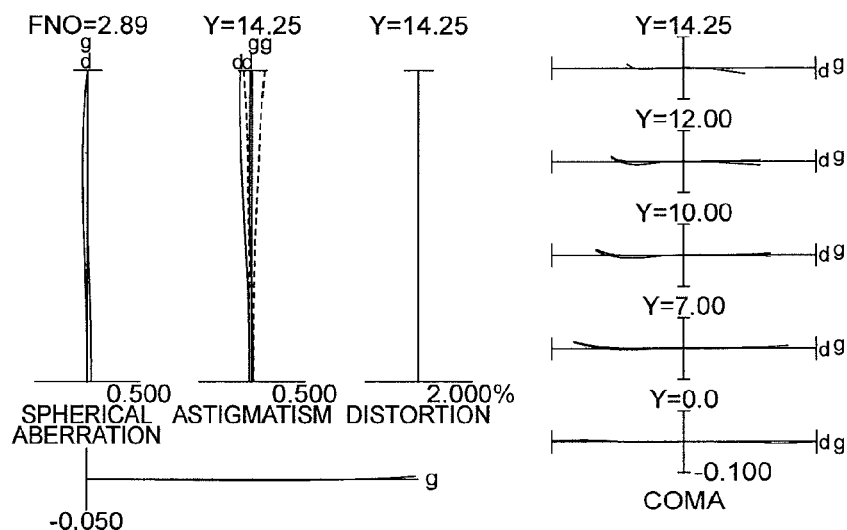
FIGS. 7A, 7B, 7C are diagrams of various aberrations of the imaging lens according to Example 1.
Figure 7B:
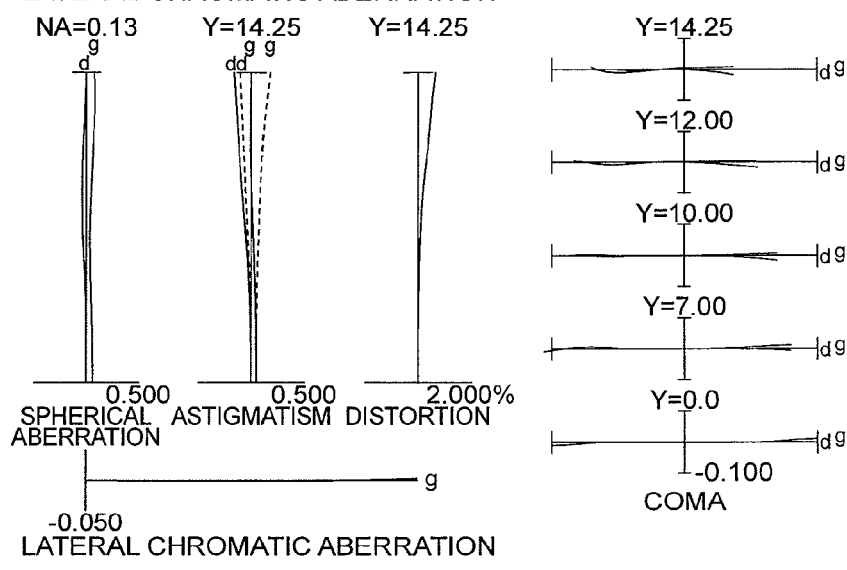
Figure 7C:
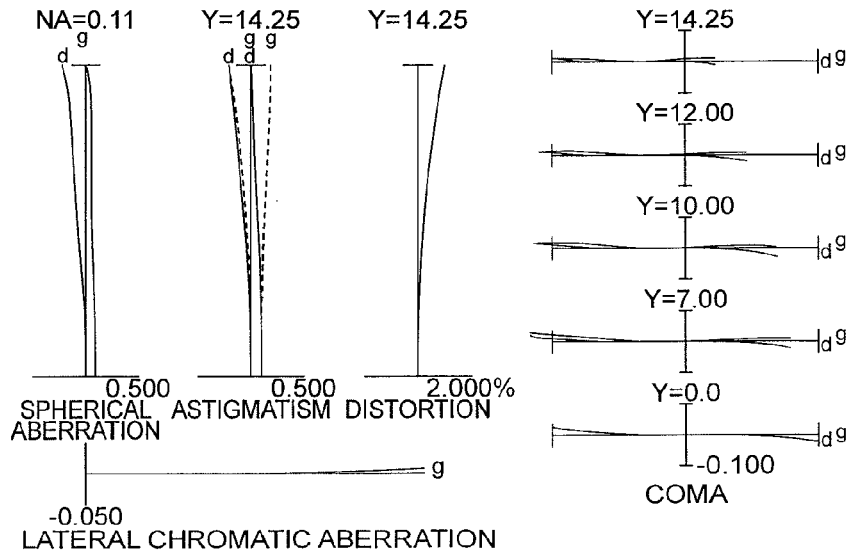

(1) $(-\beta) = 1.000$
(2) $(f2/f1) = 0.217$
(3) $Da/Db = 0.305$
(4) $X1/f = 0.691$
(5) $f/TL = 0.485$
(6) $(r2 + r1)/(r2 - r1) = 1.939$
(7) $f \times (-\beta)/f2 = 1.183$
(8) $fp/(-fn) = 0.122$
(9) $f/(-fn) = 0.033$
(10) $f/fp = 0.271$ FIGS. 7A, 7B, 7C are diagrams of various aberrations of the imaging lens according to Example 1; FIG. 7A is the diagram of the various aberrations in the infinite-distance in-focus state; FIG. 7B is the diagram of various aberrations in shooting magnification of −0.5 state; and FIG. 7C is the diagram of the various aberrations in shooting magnification of −1.0 state.

As obvious from these aberration diagrams, it is understood that the imaging lens SL3 according to Example 3 has excellent optical performance, in which the various aberrations are well corrected over the range from the infinite-distance focusing state to the near-distance photographing state.

<Example 4>

FIG. 8 is a sectional view showing a lens configuration of an imaging lens SL4 according to Example 4. In the imaging lens SL4 in FIG. 8, a first lens group G1 having positive refractive power on the whole is composed of, in order from an object side, a front group G1F having negative refractive power and a rear group G1R having positive refractive power. Further, the front group G1F is composed of, in order from the object side, two lenses such as a negative meniscus lens L11 with a concave surface directed to the image side and a double convex positive lens L12, and a rear group G1R is composed of, in order from the object side, two lenses such as a double convex positive lens L13 and a double concave negative lens L14.

The second lens group G2 having positive refractive power on the whole is composed of, in order from the object side, three lenses such as a double concave negative lens L21, a positive meniscus lens L22 with a convex surface directed to the image side, and a double convex positive lens L23.

The third lens group G3 having negative refractive power on the whole is composed of, in order from the object side, two lenses such as a negative meniscus lens L31 with a concave surface directed to the image side and a double convex positive lens L32.

Further, an aperture stop S is disposed between the first lens group G1 and the second lens group G2, and, upon focusing on the near-distance object point from the infinite-distance object point, moves to the object side together with the second lens group G2.

In the imaging lens SL4 according to Example 4, the image side lens surface of the negative meniscus lens L11 of the first lens group G1 and the object side lens surface of the double convex positive lens L12 are formed with antireflection coatings which will be described later on.

The following Table 4 shows the values of various items of data of the imaging lens SL4 according to Example 4.

TABLE 4

[Specifications]

| f = | 39.57 |
|---|---|
| Bf = | 37.89 (constant) |
| FNO = | 2.89 |
| 2ω = | 39.6 |

[Lens Data]

| i | r | d | νd | nd |
|---|---|---|---|---|
| 1 | 51.6845 | 2.000 | 70.45 | 1.48749 |
| 2 | 13.3424 | 2.400 | | |
| 3 | 72.5939 | 3.800 | 34.96 | 1.80100 |
| 4 | −77.4442 | 6.714 | | |
| 5 | 26.8652 | 3.700 | 44.79 | 1.74400 |
| 6 | −25.5925 | 0.305 | | |
| 7 | −36.0893 | 1.004 | 33.79 | 1.64769 |
| 8 | 21.4639 | (d1a) | | |
| 9 | ∞ | (d1b) | Aperture Stop S | |
| 10 | −21.4083 | 4.500 | 30.13 | 1.69895 |
| 11 | 62.1356 | 0.800 | | |
| 12 | −182.0364 | 3.338 | 56.17 | 1.65100 |
| 13 | −21.2614 | 0.567 | | |
| 14 | 45.8709 | 5.000 | 65.44 | 1.60300 |
| 15 | −30.2914 | (d2) | | |
| 16 | 111.1120 | 0.996 | 54.00 | 1.61720 |
| 17 | 30.8981 | 1.100 | | |
| 18 | 261.1151 | 2.866 | 27.51 | 1.75520 |
| 19 | −181.5345 | 0.100 | | |
| 20 | 0.0000 | 2.000 | 64.12 | 1.51680 |
| 21 | 0.0000 | (Bf) | | |

[Variable Distances]

| | INF | MID | CLD |
|---|---|---|---|
| β = | 0 | −0.5 | −1.0 |
| d0 = | ∞ | 79.5612 | 38.8435 |
| d1a = | 2.50442 | 3.41171 | 5.25214 |
| d1b = | 2.35000 | 2.35000 | 2.35000 |
| d1 = | 4.85442 | 5.76171 | 7.60214 |
| d2 = | 1.00000 | 12.52131 | 24.29696 |
| TL = | 84.93454 | 97.36315 | 110.97925 |
| ACTL = | 84.25310 | 96.68171 | 110.29781 |
| ACBf = | 39.30979 | 39.30979 | 39.30979 |

[Values for Conditional Expressions]

(1) $(-\beta) = 1.000$
(2) $(f2/f1) = 0.291$

TABLE 4-continued (3) Da/Db = 0.357
(4) X1/f = 0.663
(5) f/TL = 0.463
(6) (r2 + r1)/(r2 − r1) = 1.450
(7) f × (−β)/f2 = 1.131
(8) fp/(−fn) = 0.341
(9) f/(−fn) = 0.151
(10) f/fp = 0.443

Figure 9A:
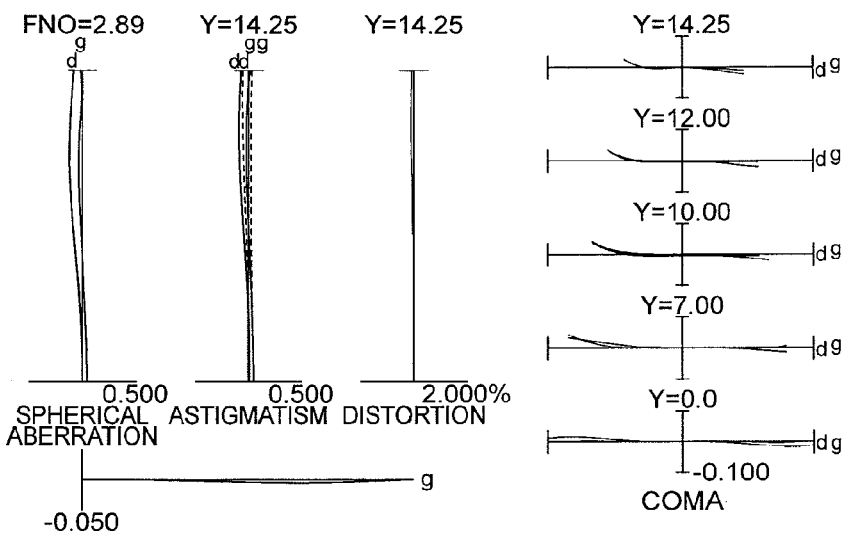
FIGS. 9A, 9B, 9C are diagrams of various aberrations of the imaging lens according to Example 1.
Figure 9B:
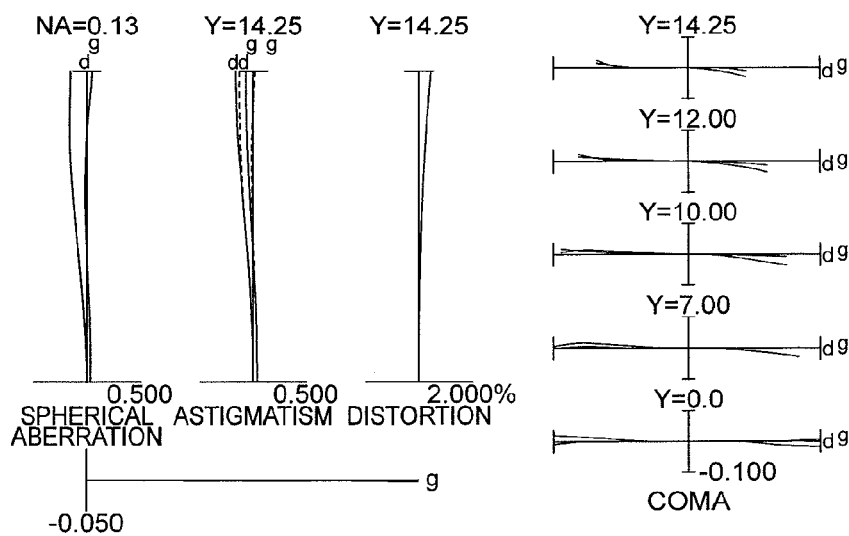
Figure 9C:
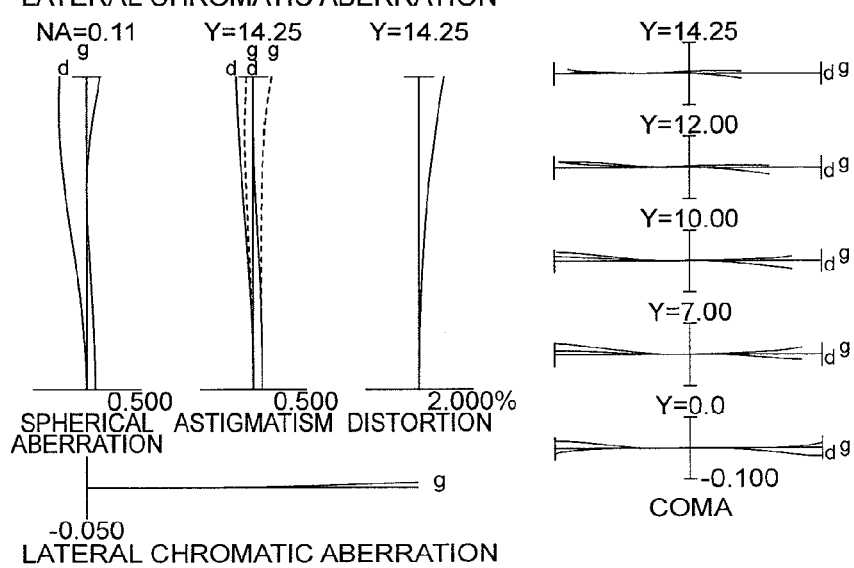

FIGS. 9A, 9B, 9C are diagrams of various aberrations of the imaging lens according to Example 1; FIG. 9A is the diagram of the various aberrations in the infinite-distance in-focus state; FIG. 9B is the diagram of various aberrations in shooting magnification of −0.5 state; and FIG. 9C is the diagram of the various aberrations in shooting magnification of −1.0 state.

As obvious from these aberration diagrams, it is understood that the imaging lens SL4 according to Example 4 has excellent optical performance, in which the various aberrations are well corrected over the range from the infinite-distance in-focus state to the near-distance photographing state.

Figure 12:
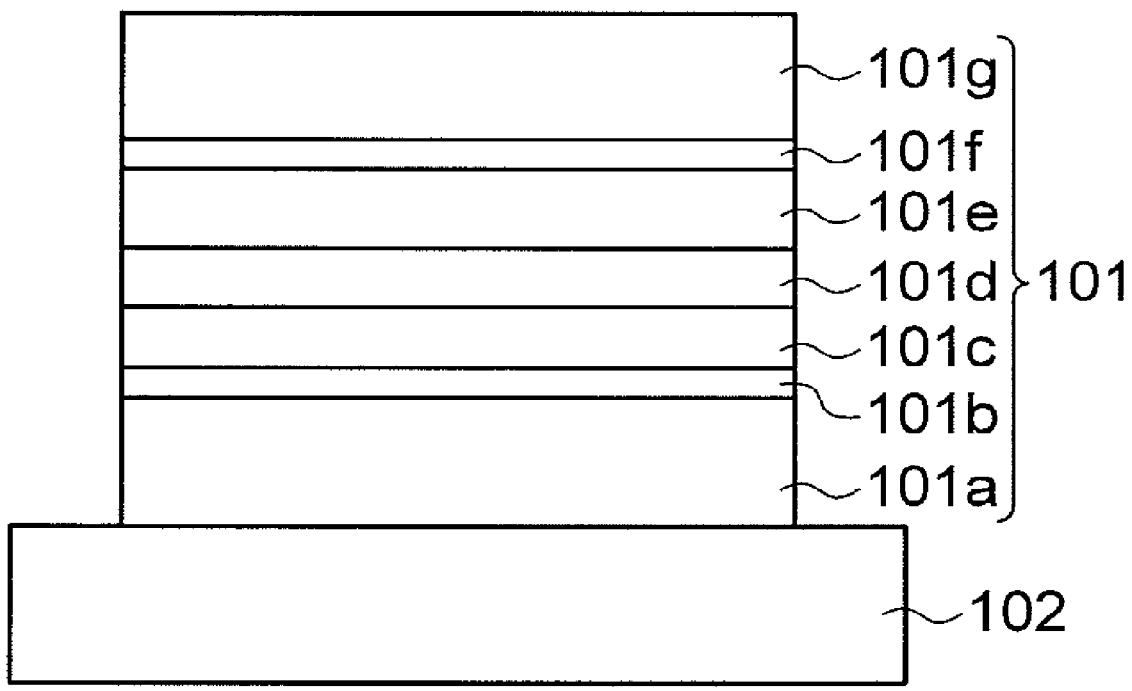
FIG. 12 is an explanatory diagram showing one example of a layer structure of an antireflection coating.

Next, the antireflection coating (which is also referred to as a multi-layered broadband antireflection coating) used for the imaging lenses SL1 through SL4 (which are generically termed the imaging lens SL) according to the embodiment, will be described. FIG. 12 is a view showing one example of a film structure of the antireflection coating. This antireflection coating 101 is a 7-layered film formed on an optical surface of an optical member 102 such as the lens. A first layer 101a is composed of aluminum oxide that is vapor-deposited by a vacuum evaporation method. A second layer 101b composed of a mixture of titanium oxide and zirconium oxide that are vapor-deposited by the vacuum evaporation method, is further formed on the first layer 101a. Moreover, a third layer 101c composed of the aluminum oxide that is vapor-deposited by the vacuum evaporation method is formed on the second layer 101b, and a fourth layer 101d composed of the mixture of titanium oxide and zirconium oxide that are vapor-deposited by the vacuum evaporation method, is further formed on the third layer 101c. Still further, a fifth layer 101e composed of aluminum oxide that is vapor-deposited by the vacuum evaporation method is formed on the fourth layer 101d, and a sixth layer 101f composed of the mixture of titanium oxide and zirconium oxide that are vapor-deposited by the vacuum evaporation method, is further formed on the fifth layer 101e.

Then, a seventh layer 101g composed of a mixture of magnesium fluoride and silica is formed by the wet process on the thus-formed sixth layer 101f, thus forming the antireflection coating 101 according to the present embodiment. The formation of the seventh layer 101g involves using a sol-gel process classified as one type of the wet process. The sol-gel process is a process of transforming a sol acquired by mixing a material into a gel having no fluidity through hydrolyzing condensation polymerization reaction and acquiring a product by heat-decomposing this gel. In manufacturing an optical thin film, the film may be generated by coating a material sol of the optical thin film over the optical surface of the optical member and dry-solidifying the sol into a gel film. Note that the wet process may involve using, without being limited to the sol-gel process, a process of acquiring a solid-state film through none of the gel state.

Thus, the first layer 101a through the sixth layer 101f of the antireflection coating 101 are formed by electron beam evaporation defined as a dry process, and the uppermost seventh layer 101g is formed in the following procedures by the wet process using a sol liquid prepared by a hydrogen fluoride/acetic acid magnesium process. To begin with, an aluminum oxide layer serving as the first layer 101a, a titanium oxide-zirconium oxide mixture layer serving as the second layer 101b, an aluminum oxide layer serving as the third layer 101c, a titanium oxide-zirconium oxide mixture layer serving as the fourth layer 101d, an aluminum oxide layer serving as the fifth layer 101e and a titanium oxide-zirconium oxide mixture layer serving as the sixth layer 101f, are formed beforehand in this sequence on a lens film growth surface (the optical surface of the optical member 102 described above) by using a vacuum evaporation apparatus. Then, after taking the optical member 102 out of the evaporation apparatus, the layer composed of the mixture of magnesium fluoride and silica is formed as the seventh layer 101g by coating silicon alkoxide-added sol liquid prepared by the hydrogen fluoride/acetic acid magnesium process in a way that uses a spin coating method. The formula (b) given below is a reaction formula on the occasion of being prepared by the hydrogen fluoride/acetic acid magnesium process:

$$2HF + Mg(CH3COO)2 \rightarrow MgF2 + 2CH3COOH \quad (b).$$

The sol liquid used for this film growth, after mixing the materials and after conducting a high-temperature pressurization maturing process at 140° C. for 24 hours in an autoclave, is used for growing the film. The optical member 102, after finishing the film growth of the seventh layer 101g, undergoes a heating process at 160° C. for one hour in the atmospheric air and is thus completed. With the use of the sol-gel process, particles on the order of several nanometers (nm) to several dozens nanometers (nm) in particle size are deposited while the air gaps remain, thereby forming the seventh layer 101g.

Optical performance of the optical member including the thus-formed antireflection coating 101 will hereinafter be described by using spectral characteristics shown in FIG. 13.

The optical member (lens) including the antireflection coating according to the present embodiment is formed under the conditions shown in the following Table 5. Herein, the Table 5 shows respective optical film thicknesses of the layers 101a (the first layer) through 101g (the seventh layer) of the antireflection coating 101, which are obtained under such conditions that λ denotes a reference wavelength and the refractive index of the substrate (optical member) is set to 1.62, 1.74 and 1.85. Note that the Table 5 shows $Al_2O_3$ expressed as the aluminum oxide, $ZrO_2+TiO_2$ expressed as the mixture of titanium oxide and zirconium oxide and $MgF_2+SiO_2$ expressed as the mixture of magnesium fluoride and silica.

Figure 13:
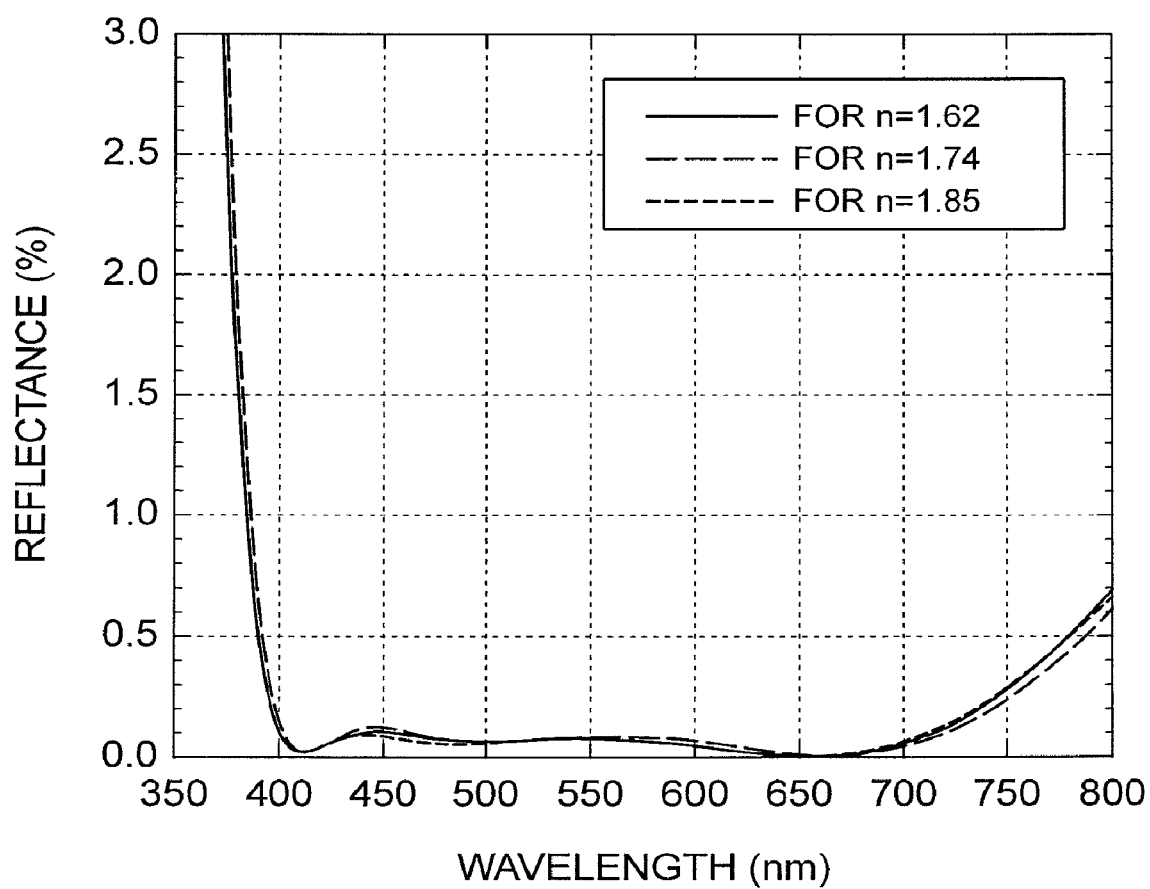
FIG. 13 is a graphic chart showing spectral characteristics of the antireflection coating.

FIG. 13 shows the spectral characteristics when the light beams vertically get incident on the optical member in which the optical film thickness of each of the layers of the antireflection coating 101 is designed, with the reference wavelength λ set to 550 nm in the Table 5.

It is understood from FIG. 13 that the optical member including the antireflection coating 101 designed with the reference wavelength λ set to 550 nm can restrain the reflectance down to 0.2% or under over the entire range in which the wavelengths of the light beams are 420 nm through 720 nm. Further, in the Table 5, even the optical member including the antireflection coating 101, in which each optical film thickness is designed with the reference wavelength λ set to the d-line (wavelength 587.6 nm), has substantially the same spectral characteristics as in the case where the reference wavelength λ shown in FIG. 13 is 550 nm in a way that affects substantially none of the spectral characteristics thereof.

TABLE 5

| layer | material | n | thicknesses of layers | | |
|---|---|---|---|---|---|
| | medium air | 1 | | | |
| 7 | MgF2 + SiO2 | 1.26 | 0.268λ | 0.271λ | 0.269λ |
| 6 | ZrO2 + TiO2 | 2.12 | 0.057λ | 0.054λ | 0.059λ |
| 5 | Al2O3 | 1.65 | 0.171λ | 0.178λ | 0.162λ |
| 4 | ZrO2 + TiO2 | 2.12 | 0.127λ | 0.13λ | 0.158λ |
| 3 | Al2O3 | 1.65 | 0.122λ | 0.107λ | 0.08λ |
| 2 | ZrO2 + TiO2 | 2.12 | 0.059λ | 0.075λ | 0.105λ |
| 1 | Al2O3 | 1.65 | 0.257λ | 0.03λ | 0.03λ |
| | n (substrate) | | 1.62 | 1.74 | 1.85 |

Next, a modified example of the antireflection coating will be explained. The antireflection coating is a 5-layered film, and, similarly to the Table 5, the optical film thickness of each layer with respect to the reference wavelength λ is designed under conditions shown in the following Table 6. In this modified example, the formation of the fifth layer involves using the sol-gel process described above.

Figure 14:
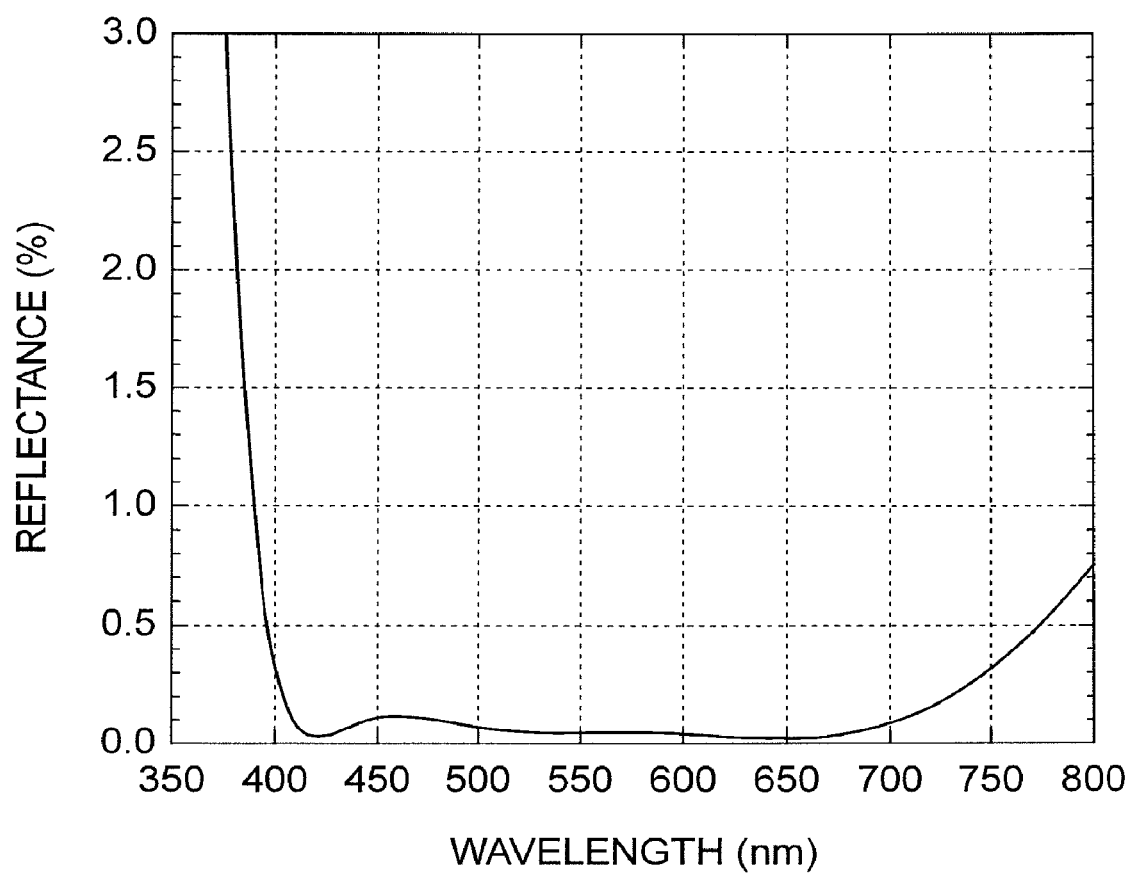
FIG. 14 is a graphic chart showing the spectral characteristics of the antireflection coating according to a modified example.

FIG. 14 shows the spectral characteristics when the light beams vertically get incident on the optical member in which the optical film thickness of each of the layers is designed, with the substrate refractive index set to 1.52 and the reference wavelength λ set to 550 nm in the Table 6. It is understood from FIG. 14 that the antireflection coating in the modified example can restrain the reflectance down to 0.2% or under over the entire range in which the wavelengths of the light beams are 420 nm-720 nm. Note that in the Table 6, even the optical member including the antireflection coating, in which each optical film thickness is designed with the reference wavelength λ set to the d-line (wavelength 587.6 nm), has substantially the same spectral characteristics as the spectral characteristics shown in FIG. 14 in a way that affects substantially none of the spectral characteristics thereof.

Figure 15:
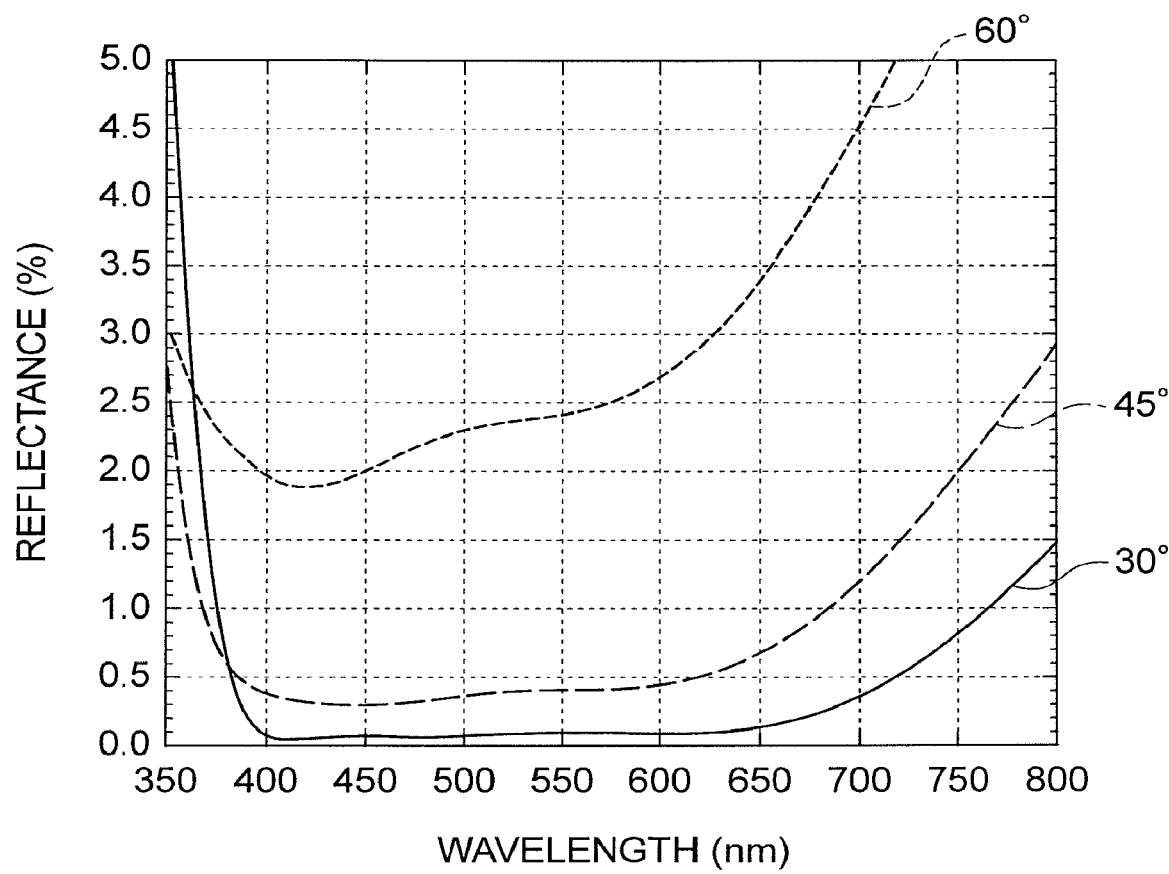
FIG. 15 is a graphic chart showing incident angle dependency of the spectral characteristics of the antireflection coating according to the modified example.

FIG. 15 shows the spectral characteristics in such a case that the incident angles of the light beams upon the optical member having the spectral characteristics shown in FIG. 14 are 30 degrees, 45 degrees and 60 degrees, respectively. Note that FIGS. 14 and 15 do not illustrate the spectral characteristics of the optical member including the antireflection coating in which the substrate refractive index is 1.46, however, it is understood that the optical member has substantially the same spectral characteristics such as the substrate refractive index being 1.52.

TABLE 6

| layer | material | n | thicknesses of layers | |
|---|---|---|---|---|
| | medium air | 1 | | |
| 5 | MgF2 + SiO2 | 1.26 | 0.275λ | 0.269λ |
| 4 | ZrO2 + TiO2 | 2.12 | 0.045λ | 0.043λ |
| 3 | Al2O3 | 1.65 | 0.212λ | 0.217λ |
| 2 | ZrO2 + TiO2 | 2.12 | 0.077λ | 0.066λ |
| 1 | Al2O3 | 1.65 | 0.288λ | 0.290λ |
| | n (substrate) | | 1.46 | 1.52 |

Figure 16:
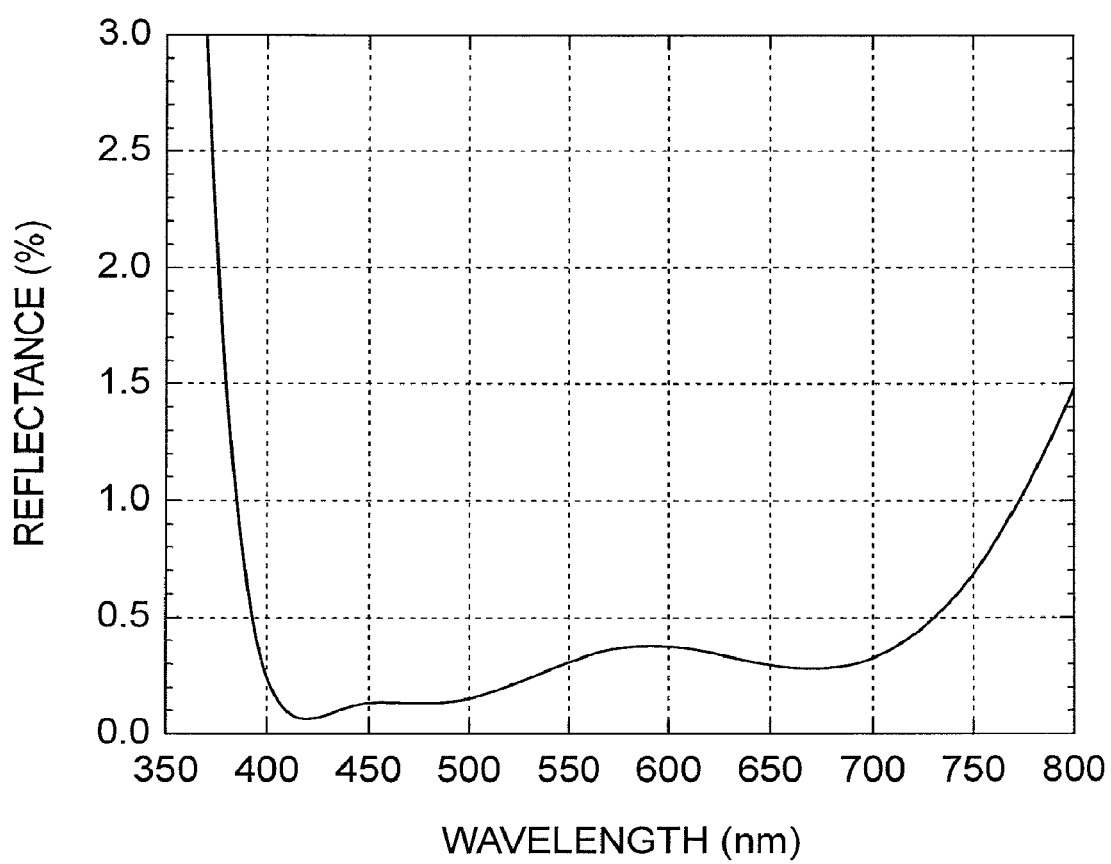
FIG. 16 is a graphic chart showing the spectral characteristics of the antireflection coating manufactured by the prior art.

Furthermore, FIG. 16 shows one example of the antireflection coating grown by only the dry process such as the conventional vacuum evaporation method by way of a comparison. FIG. 16 shows the spectral characteristics when the light beams get incident on the optical member in which to design the antireflection coating structured under the conditions shown in the following Table 7, with the substrate refractive index set to 1.52 in the same way as in the Table 6. Moreover, FIG. 17 shows the spectral characteristics in such a case that the incident angles of the light beams upon the optical member having the spectral characteristics shown in FIG. 16 are 30 degrees, 45 degrees and 60 degrees, respectively.

TABLE 7

| layer | material | n | thicknesses of layers |
|---|---|---|---|
| | medium air | 1 | |
| 7 | MgF2 | 1.39 | 0.243λ |
| 6 | ZrO2 + TiO2 | 2.12 | 0.119λ |
| 5 | Al2O3 | 1.65 | 0.057λ |
| 4 | ZrO2 + TiO2 | 2.12 | 0.220λ |
| 3 | Al2O3 | 1.65 | 0.064λ |
| 2 | ZrO2 + TiO2 | 2.12 | 0.057λ |
| 1 | Al2O3 | 1.65 | 0.193λ |
| | refractive index of substrate | | 1.52 |

Figure 17:
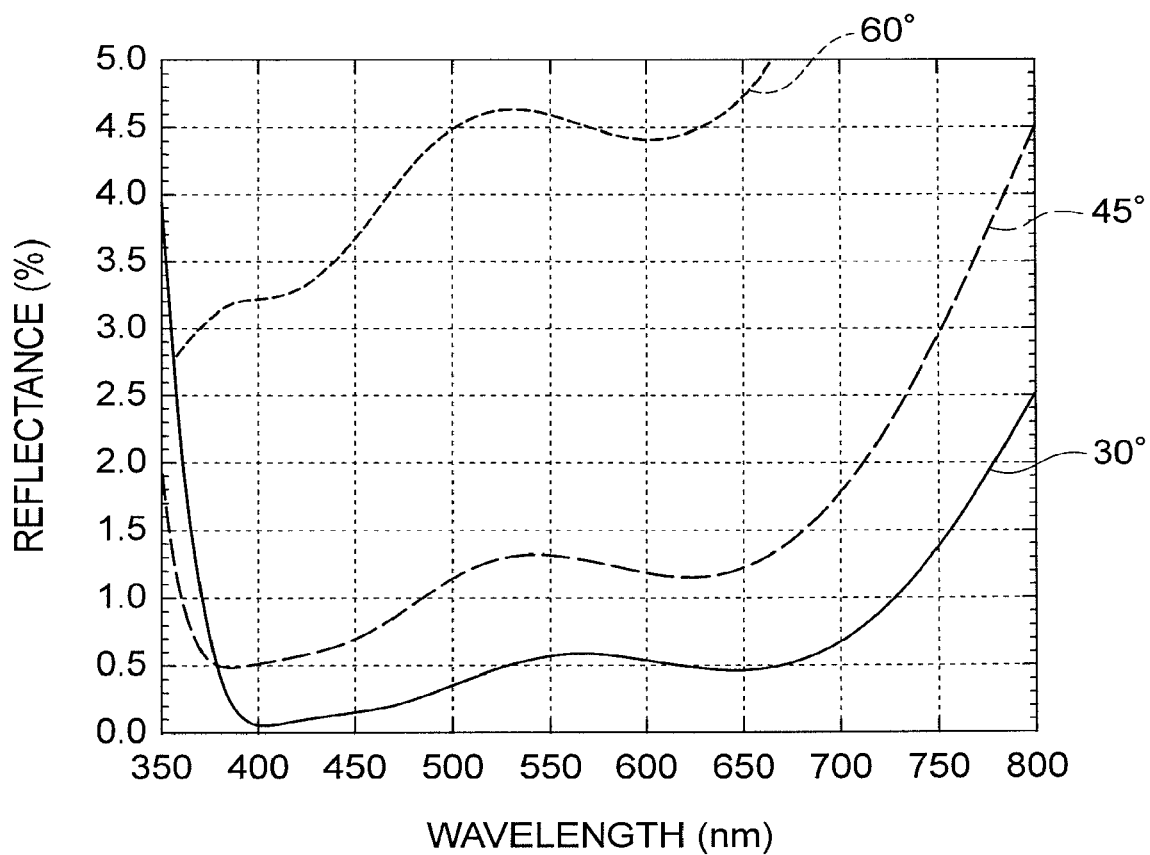
FIG. 17 is a graphic chart showing the incident angle dependency of the spectral characteristics of the antireflection coating manufactured by the prior art.

To compare the spectral characteristics of the optical member including the antireflection coating according to the present embodiment illustrated in FIGS. 13 through 15 with the spectral characteristics in the conventional examples shown in FIGS. 16 and 17, it is well understood that the present antireflection coating has the much lower reflectance at any incident angles and, besides, has the low reflectance in the broader band.

Explained next is an example of applying the antireflection coating shown in the Tables 5 and 6 to Examples 1 through 4 discussed above.

In the imaging lens SL1 according to Example 1, as shown in the Table 1, the refractive index nd of the negative meniscus lens L11 of the first lens group G1 is 1.48749 (nd=1.48749), and the refractive index nd of the double convex positive lens L12 of the first lens group G1 is 1.80604 (nd=1.80604), whereby it is feasible to reduce lessen the reflected light from each lens surface and to reduce ghost images and flare as well by applying the antireflection coating 101 (see Table 6) corresponding to 1.46 as the substrate refractive index to the object-sided lens surface of the negative meniscus lens L11 and applying the antireflection coating (see Table 5) corresponding to 1.85 as the substrate refractive index to the object-sided lens surface of the double convex positive lens L12.

Further, in the imaging lens SL2 according to Example 2, as shown in the Table 2, the refractive index nd of the negative meniscus lens L11 of the first lens group G1 is 1.62041 (nd=1.62041), and the refractive index nd of the double convex positive lens L12 of the first lens group G1 is 1.75520 (nd=1.75520), whereby it is feasible to reduce lessen the reflected light from each lens surface and to reduce ghost images and flare as well by applying the antireflection coating 101 (see Table 5) corresponding to 1.62 as the substrate refractive index to the image-sided lens surface of the negative meniscus lens L11 and applying the antireflection coating (see Table 5) corresponding to 1.74 as the substrate refractive index to the object side lens surface of the double convex positive lens L12.

Moreover, in the imaging lens SL3 according to Example 3, as shown in the Table 3, the refractive index nd of the negative meniscus lens L11 of the first lens group G1 is 1.52249 (nd=1.52249), whereby it is feasible to reduce lessen the reflected light from each lens surface and to reduce ghost images and flare as well by applying the antireflection coating (see Table 6) corresponding to 1.52 as the substrate refractive index to the image and object side lens surfaces of the negative meniscus lens L11.

Further, in the imaging lens SL4 according to Example 4, as shown in the Table 4, the refractive index nd of the negative meniscus lens L11 of the first lens group G1 is 1.48749 (nd=1.48749), and the refractive index nd of the double convex positive lens L12 of the first lens group G1 is 1.80100 (nd=1.80100), whereby it is feasible to reduce lessen the reflected light from each lens surface and to reduce ghost images and flare as well by applying the antireflection coating 101 (see Table 6) corresponding to 1.46 as the substrate refractive index to the image-sided lens surface of the negative meniscus lens L11 and applying the antireflection coating 101 (see Table 5) corresponding to 1.85 as the substrate refractive index to the object-sided lens surface of the double convex positive lens L12.

It should be noted that in the embodiment discussed above, the contents described as below can be properly adopted within a range that does not affect optical performance.

In the discussion made above and the embodiment which will hereinafter be described, though the 3-group configuration has been exemplified, other group configurations such as a 4-group configuration and a 5-group configuration can be applied. Further, other available configurations are a configuration of adding a lens or a lens group on the object side and a configuration of adding a lens or a lens group on the side closest to the image. Still further, a lens group represents a portion having at least one lens, which is separated by air distances that changes upon focusing.

Moreover, such a focusing lens group may be taken that a single or a plurality of lens groups or a segmental lens group is moved along the optical axis to thereby perform focusing on the near-distance object point from the infinite-distance object point. In this case, the focusing lens group can be applied to an auto focus and is suited to driving a motor (such as an ultrasonic motor) for the auto focus. Especially, it is desirable that the first lens group G1 and the second lens group G2 serves as the focusing lens group.

A vibration reduction lens group which corrects an image blur caused by a hand vibration (camera shake) may also be constructed in a way that moves a lens group or a segmental lens group so as to include a component in a direction perpendicular to the optical axis or rotationally moves (sways) the lens group or the segmental lens group in an intra-plane direction containing the optical axis. In particular, it is preferable that at least a portion of the second lens group G2 or the third lens group G3 is constructed as the vibration reduction lens group.

Moreover, any lens surface may be formed as a spherical surface, a plane surface or an aspherical surface. When a lens surface is a spherical surface or a plane surface, processing and assembly become easy, so that deterioration of optical performance caused by errors upon processing and assembling can be prevented. Even if the lens surface is shifted, deterioration in optical performance is small, so that it is desirable.

When the lens surface is an aspherical surface, the aspherical surface may be fabricated by a fine grinding process, a glass molding process that a glass material is formed into an aspherical shape by a mold, or a compound type process that a resin material is formed into an aspherical shape on a glass surface. Any lens surface may be a diffractive optical surface. Any lens may be a graded index lens (GRIN lens), or a plastic lens.

The aperture stop S is, it is preferable, disposed between the first lens group G1 and the second lens group G2, however, an available configuration is that a lens frame substitutes for a role of the aperture stop without providing a member as the aperture stop.

Furthermore, it is preferable that in the imaging lens SL according to the present embodiment, the first lens group G1 includes two positive lens elements and two negative lens elements. Further, it is preferable that the first lens group G1 includes, in order from the object side, the lens elements disposed in the negative/positive/positive/negative order with air distances in between. Moreover, it is preferable that in the imaging lens SL according to the present embodiment, the second lens group G2 includes two positive lens elements. Alternatively, it is preferable that in the imaging lens SL according to the present embodiment, the second lens group G2 includes one positive lens element and one negative lens element. Furthermore, it is preferable that in the imaging lens SL according to the present embodiment, the third lens group G3 includes one positive lens element and one negative lens element. Moreover, it is preferable that the third lens group G3 includes, in order from the object side, the lens elements disposed in the negative/positive order with an air distance in between.

Note that the present embodiment has been discussed in a way that adds the constructive requirements for providing an easy-to-understand description of the present invention, however, as a matter of course, the present invention is not limited to this descriptive mode.

As discussed above, according to the present invention, it is feasible to provide an imaging lens which reduces ghost images and flare, maintains a sufficient back focal length while keeping a sufficient angle of view, simplifies the configuration of the lens barrel and enables the total lens length and the moving amount to be decreased, an optical apparatus including the imaging lens and a method for manufacturing thereof.

What is claimed is:

1. An imaging lens comprising, in order from an object side:
    a first lens group having positive refractive power;
    a second lens group having positive refractive power; and
    a third lens group having negative refractive power,
    said first lens group including a negative meniscus lens with a concave surface directed to an image side disposed closest to the object,
    an aperture stop being disposed between said first lens group and said second lens group,
    said first lens group and said second lens group moving to the object side with changing a distance between said first lens group and said second lens group upon focusing on a near-distance object point from an infinite-distance object point,
    at least one optical surface of said first lens group being provided with an antireflection coating, said antireflection coating including at least one layer formed by use of a wet process, and
    when nd is a refractive index of the layer formed by use of the wet process, nd being equal to or smaller than 1.30.

2. The imaging lens according to claim 1, wherein said antireflection coating is a multi-layered film, and the layer formed by the wet process is a layer which is an uppermost layer of the layers composing said multi-layered film.

3. The imaging lens according to claim 1, wherein said optical surface is a concave surface viewed from said aperture stop.

4. The imaging lens according to claim 3, wherein the concave surface viewed from said aperture stop is the image side lens surface.

5. The imaging lens according to claim 3, wherein the concave surface viewed from said aperture stop is the object side lens surface.

6. The imaging lens according to claim 3, wherein the concave surface viewed from said aperture stop is the lens surface of said lens closest to the object side.

7. The imaging lens according to claim 3, wherein the concave surface viewed from said aperture stop is a lens surface of a second lens counted from the lens closest to the object side.

8. An optical apparatus including said imaging lens according to claim 1.

9. An imaging lens comprising, in order from an object side:
a first lens group having positive refractive power;
a second lens group having positive refractive power; and
a third lens group having negative refractive power,
said first lens group including a negative meniscus lens with a concave surface directed to an image side disposed closest to the object,
an aperture stop being disposed between said first lens group and said second lens group,
said first lens group and said second lens group moving to the object side with changing a distance between said first lens group and said second lens group upon focusing on a near-distance object point from an infinite-distance object point, and
said imaging lens satisfying the following conditional expression:

$$0.5 \leq (-\beta)$$

where β denotes a shooing magnification upon focusing on the nearest object point.

10. The imaging lens according to claim 9, wherein said imaging lens satisfies the following conditional expression:

$$0.07 < f2/f1 < 0.35$$

where f1 denotes a focal length of said first lens group, and f2 denotes a focal length of said second lens group.

11. The imaging lens according claim 9, wherein said first lens group includes, in order from the object side:
a negative lens with a concave surface directed to the image side;
a first positive lens; and
a second positive lens, and
said first lens group satisfies the following conditional expression:

$$0.10 < Da/Db < 2.00$$

where Da is a distance along an optical axis between a surface closest to the image side of said negative lens and a surface closest to the object side of said first positive lens, and Db is a distance along the optical axis between a surface closest to the image side of said first positive lens and a surface closest to the object side of said second positive lens.

12. The imaging lens according to claim 9, wherein said imaging lens satisfies the following conditional expression:

$$0.40 < X1/f < 0.90$$

where X1 denotes an absolute value of a moving amount of said first lens group along an optical axis upon focusing on the nearest-distance object point from the infinite-distance object point, and f denotes a focal length of the imaging lens.

13. The imaging lens according to claim 9, wherein said imaging lens satisfies the following conditional expression:

$$0.35 < f/TL < 1.20$$

where TL denotes a total lens length in an infinite-distance focusing state, and f denotes a focal length of the imaging lens.

14. The imaging lens according to claim 9, wherein said first lens group includes, in order from the object side, a negative lens with a concave surface directed to the image side and a positive lens, and satisfies the following conditional expression:

$$0.90 < (r2+r1)/(r2-r1) < 2.50$$

where r1 is a radius of curvature of the surface closest to the image side of said negative lens, and r2 denotes a radius of curvature of the surface closest to the object side of said positive lens.

15. The imaging lens according to claim 9, wherein said imaging lens satisfies the following conditional expression:

$$0.30 < f \times (-\beta)/f2 < 1.50$$

where f denotes a focal length of the imaging lens, and f2 denotes a focal length of said second lens group.

16. The imaging lens according to claim 9, wherein said third lens group includes at least one negative lens and at least one positive lens.

17. The imaging lens according to claim 9, wherein said third lens group includes a positive lens on the side closest to the image.

18. The imaging lens according to claim 9, wherein said third lens group is fixed with respect to an image plane upon focusing.

19. An optical apparatus including said imaging lens according to claim 9.

20. An imaging lens comprising, in order from an object side:
a first lens group having positive refractive power;
a second lens group having positive refractive power; and
a third lens group having negative refractive power,
said first lens group including a negative meniscus lens with a concave surface directed to an image side disposed closest to the object,
an aperture stop being disposed between said first lens group and said second lens group,
said first lens group and said second lens group moving to the object side with changing a distance between said first lens group and said second lens group upon focusing on a near-distance object point from an infinite-distance object point, and
said first lens group including, in order from the object side, a front group having negative refractive power in combination including a negative lens with a concave surface directed to the image side and a positive lens, and a rear group having positive refractive power in combination disposed on the image side of said front group.

21. The imaging lens according to claim 20, wherein the following conditional expression is satisfied:

$$0.05 < fp/(-fn) < 0.60$$

where fn denotes a focal length of said front group, and fp denotes a focal length of said rear group.

22. The imaging lens according to claim 20, wherein the following conditional expression is satisfied:

$$0.04 < f/(-fn)$$

where fn denotes a focal length of said front group, and f denotes a focal length of the imaging lens.

23. The imaging lens according to claim 20, wherein the following conditional expression is satisfied:

$$0.07 < f/fp < 0.80$$

where fp denotes a focal length of said rear group, and f is the focal length of the imaging lens.

24. An imaging lens comprising, in order from an object side:
a first lens group having positive refractive power;

a second lens group having positive refractive power; and
a third lens group having negative refractive power,
said first lens group including a negative meniscus lens with a concave surface directed to an image side disposed closest to the object,
an aperture stop being disposed between said first lens group and said second lens group,
said first lens group and said second lens group moving to the object side with changing a distance between said first lens group and said second lens group upon focusing on a near-distance object point from an infinite-distance object point, and
said third lens group being composed of four or less lenses.

25. A method for manufacturing an imaging lens comprising, in order from an object side:
a first lens group having positive refractive power;
a second lens group having positive refractive power; and
a third lens group having negative refractive power,
the method comprising steps of:
disposing a negative meniscus lens with a concave surface directed to an image side on the side closest to the object of said first lens group;
disposing an aperture stop between said first lens group and said second lens group;
disposing said first lens group and said second lens group for moving to the object side in such a manner that upon focusing on a near-distance object point from an infinite-distance object point a distance between said first lens group and said second lens group varies;
applying an antireflection coating to at least one optical surface among the first lens group through the third lens group such that the antireflection coating includes at least one layer formed by a wet process; and
providing said optical surface with a concave surface viewed from said aperture stop.

26. A method for manufacturing an imaging lens comprising, in order from an object side:
a first lens group having positive refractive power;
a second lens group having positive refractive power; and
a third lens group having negative refractive power,
the method comprising steps of:
disposing a negative meniscus lens with a concave surface directed to an image side on the side closest to the object of said first lens group;
disposing an aperture stop between said first lens group and said second lens group;
disposing said first lens group and said second lens group for moving to the object side in such a manner that upon focusing on a near-distance object point from an infinite-distance object point a distance between said first lens group and said second lens group varies, and
satisfying the following conditional expression:

$$0.5 < (-\beta)$$

where $\beta$ denotes a shooing magnification upon focusing on the nearest object point.

27. The method according to claim 26, further comprising a step of:
satisfying the following conditional expression:

$$0.07 < f2/f1 < 0.35$$

where f1 denotes a focal length of said first lens group, and f2 denotes a focal length of said second lens group.

* * * * *

UNITED STATES PATENT AND TRADEMARK OFFICE
CERTIFICATE OF CORRECTION

PATENT NO. : 8,411,369 B2
APPLICATION NO. : 13/253493
DATED : April 2, 2013
INVENTOR(S) : Muratani et al.

Page 1 of 1

It is certified that error appears in the above-identified patent and that said Letters Patent is hereby corrected as shown below:

On the Title Page: insert

Item -- (60) Related U.S. Application Data
Continuation of Application No. 13/006,210, filed January 13, 2011 (abandoned) --

Signed and Sealed this
Sixth Day of October, 2015

Michelle K. Lee
*Director of the United States Patent and Trademark Office*